US012259471B2

(12) United States Patent
Mahara

(10) Patent No.: US 12,259,471 B2
(45) Date of Patent: Mar. 25, 2025

(54) MEASUREMENT APPARATUS, DISTANCE MEASUREMENT APPARATUS, AND MEASUREMENT METHOD

(71) Applicant: Sony Semiconductor Solutions Corporation, Kanagawa (JP)

(72) Inventor: Kumiko Mahara, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 1000 days.

(21) Appl. No.: 17/290,594

(22) PCT Filed: Nov. 27, 2019

(86) PCT No.: PCT/JP2019/046258
§ 371 (c)(1),
(2) Date: Apr. 30, 2021

(87) PCT Pub. No.: WO2020/137318
PCT Pub. Date: Jul. 2, 2020

(65) Prior Publication Data
US 2021/0356589 A1 Nov. 18, 2021

(30) Foreign Application Priority Data
Dec. 26, 2018 (JP) .................. 2018-243754

(51) Int. Cl.
*G01S 17/18* (2020.01)
*G01S 7/48* (2006.01)
(Continued)

(52) U.S. Cl.
CPC ............ *G01S 17/18* (2020.01); *G01S 7/4806* (2013.01); *G01S 7/484* (2013.01); *G01S 7/4865* (2013.01); *G01S 17/89* (2013.01); *G01S 17/931* (2020.01)

(58) Field of Classification Search
None
See application file for complete search history.

(56) References Cited

U.S. PATENT DOCUMENTS 6,661,500 B1  12/2003  Kindt et al.
2002/0043611 A1  4/2002  Yoshikawa
(Continued)

FOREIGN PATENT DOCUMENTS

CN  105849620 A  8/2016
CN  108431626 A  8/2018
(Continued)

OTHER PUBLICATIONS

International Search Report (PCT/ISA/210), International Application No. PCT/JP2019/046258, dated Feb. 7, 2020.
(Continued)

*Primary Examiner* — Hovhannes Baghdasaryan
(74) *Attorney, Agent, or Firm* — Michael Best & Friedrich LLP

(57) ABSTRACT

A measurement apparatus includes a light reception section including a light reception element group including light reception elements in a target region, a controller that controls a first light reception element group and a second light reception element group in the light reception element group, so as to read out the first light reception element group and the second light reception element group during periods different from each other, and a signal processing section that performs signal processing on the basis of a signal read out from at least one of the first light reception element group and the second light reception element group. A sum set of the first light reception element group and the second light reception element group includes the light
(Continued)

reception elements, and at least part of the first light reception element group is not included in the second light reception element group.

4 Claims, 18 Drawing Sheets

(51) Int. Cl.
*G01S 7/484* (2006.01)
*G01S 7/4865* (2020.01)
*G01S 17/89* (2020.01)
*G01S 17/931* (2020.01)

(56) References Cited

U.S. PATENT DOCUMENTS

| 2015/0241564 A1 | 8/2015 | Takano |
| 2015/0285625 A1 | 10/2015 | Deane |
| 2018/0081033 A1 | 3/2018 | Demirtas |
| 2018/0259645 A1 | 9/2018 | Shu et al. |
| 2019/0094342 A1 | 3/2019 | Hiramatsu et al. |

FOREIGN PATENT DOCUMENTS

| JP | 2016176721 A | 10/2016 |
| JP | 2017-520134 A | 7/2017 |
| JP | 2018044923 A | 3/2018 |
| JP | 2019-060652 A | 4/2019 |
| WO | 2018/091970 A1 | 5/2018 |
| WO | WO-2018140480 A1 | 8/2018 |

OTHER PUBLICATIONS

Notification of Transmittal of the International Search Report and the Written Opinion of the International Searching Authority, or the Declaration (PCT/ISA/220), International Application No. PCT/JP2019/046258, dated Feb. 18, 2020.

Written Opinion of the International Search Authority (PCT/ISA/237), International Application No. PCT/JP2019/046258, dated Feb. 18, 2020.

Frame=1

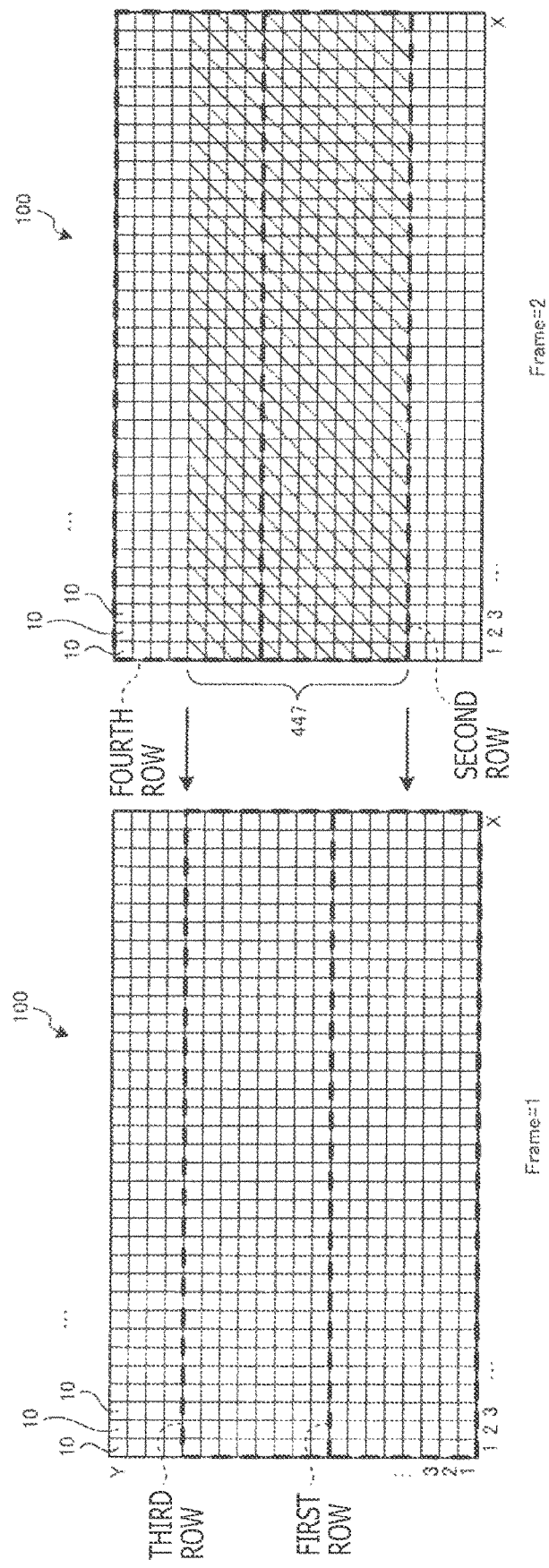

MEASUREMENT APPARATUS, DISTANCE MEASUREMENT APPARATUS, AND MEASUREMENT METHOD

TECHNICAL FIELD

The present disclosure relates to a measurement apparatus, a distance measurement apparatus, and a measurement method.

BACKGROUND ART

As one of distance measurement methods for measuring the distance to a measurement target by using light, a distance measurement method called direct ToF (Time of Flight) method is available. In distance measurement processing by the direct ToF method, reflected light originating from light emitted from a light source and reflected by a measurement target is received by a light reception element, and the distance to the target is measured on the basis of a time period from emission of light to reception of the light as reflected light. Further, in the direct ToF method, known is a configuration that performs distance measurement using a pixel array in which light reception elements are arrayed in a two-dimensional grid pattern.

In distance measurement using a pixel array, in a case where driving or outputting of a result of distance measurement is performed simultaneously for all of light reception elements included in the pixel array, there are limitations on such points as power consumption, a communication band of data, a circuit scale and so forth. Thus, a division driving method in which a pixel array is divided into plural regions and the divided regions are driven sequentially to perform distance measurement result outputting has been proposed.

CITATION LIST

Patent Literature

[PTL 1]
Japanese Patent Laid-Open No. 2018-044923
[PTL 2]
Japanese Patent Laid-Open No. 2016-176721

SUMMARY

Technical Problems

In the division driving method according to the existing technology, for example, the time difference between distance measurement processing for a lower end region of the pixel array and distance measurement processing for an upper end region of the pixel array is great, and there is a possibility that it is difficult to secure the simultaneity of distance measurement results in the entire pixel array. In this case, it is difficult to measure the distance to a measurement target whose distance to the distance measurement apparatus changes at a high speed.

It is an object of the present disclosure to provide a measurement apparatus, a distance measurement apparatus, and a measurement method by which distance measurement with higher accuracy can be achieved.

Solution to Problems

A measurement apparatus according to the present disclosure includes a light reception section including a light reception element group including plural light reception elements included in a target region, a control section that controls a first light reception element group and a second light reception element group included in the light reception element group, so as to read out the first light reception element group and the second light reception element group during periods different from each other, and a signal processing section that performs signal processing on the basis of a signal read out from at least one of the first light reception element group and the second light reception element group. In the measurement apparatus, a sum set of the first light reception element group and the second light reception element group includes all of the plural light reception elements, and at least part of the first light reception element group is not included in the second light reception element group.

BRIEF DESCRIPTION OF DRAWINGS

FIG. 17 is a view illustrating a scanning method according to a third modification of the first embodiment.

DESCRIPTION OF EMBODIMENTS

In the following, a first embodiment of the present disclosure is described in detail with reference to the drawings. It is to be noted that, in the following first embodiments, identical elements are denoted by identical reference signs and overlapping description is omitted.

Technology Applicable to Embodiments

The present disclosure relates to a technology for performing distance measurement using light. Prior to the description of the embodiments of the present disclosure, in order to facilitate understanding, a technology that can be applied to the embodiments is described. In the embodiments, the direct ToF method (Time Of Flight) method is applied as a distance measurement method. The direct ToF method is a method in which reflected light originating from light emitted from a light source and reflected by a measurement target is received by a light reception element and distance measurement is performed on the basis of time of difference between a light emission timing and a light reception timing.

Figure 1:
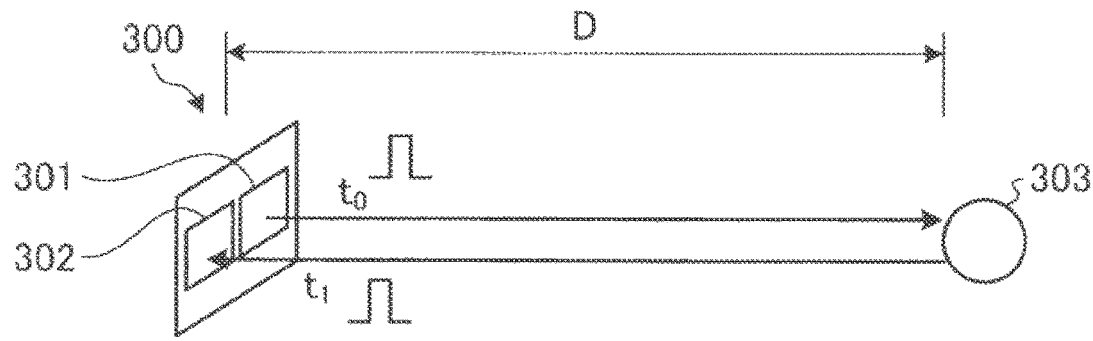
FIG. 1 is a view schematically depicting distance measurement by the direct ToF method that can be applied to embodiments.
Figure 2:
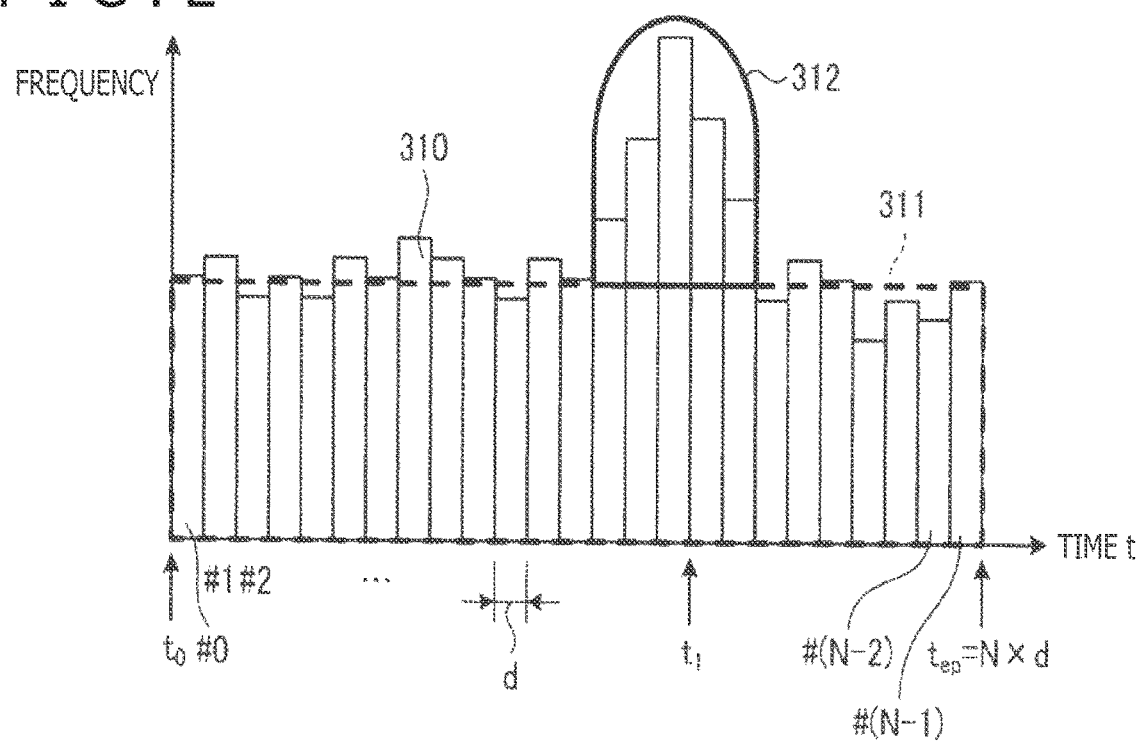
FIG. 2 is a view depicting a histogram of an example that can be applied to a first embodiment and is based on time at which a light reception section receives light.

Distance measurement according to the direct ToF method is described briefly with reference to FIGS. 1 and 2. FIG. 1 is a view schematically depicting distance measurement by the direct ToF method that can be applied to the embodiments. A distance measurement apparatus 300 includes a light source section 301 and a light reception section 302. The light source section 301 is, for example, a laser diode and is driven so as to emit laser light in a pulsed form. The light emitted from the light source section 301 is reflected by a measurement target 303 and is received as reflected light by the light reception section 302. The light reception section 302 includes a light reception element for converting light into an electric signal by photoelectric conversion and outputs a signal corresponding to the received light.

Here, time at which the light source section 301 emits light (light emission timing) is represented as time $t_0$ and time at which reflected light originating from the light emitted from the light source section 301 and reflected by the measurement target 303 is received by the light reception section 302 (light reception timing) is represented as time $t_1$. If it is assumed that a constant c is the light speed ($2.9979 \times 10^8$ [m/sec]), then the distance D between the distance measurement apparatus 300 and the measurement target 303 is calculated by the following expression (1).

$$D=(c/2)\times(t_1-t_0) \qquad (1)$$

The distance measurement apparatus 300 repetitively executes the process described above for a plural number of times. The light reception section 302 includes plural light reception elements, and the distance D may be calculated on the basis of light reception timings at which reflected light is individually received by the light reception elements. The distance measurement apparatus 300 classifies a time period $t_m$ from the time $t_0$ of the light emission timing to the light reception timing at which the light is received by the light reception section 302 (the time period is referred to as a light reception time period $t_m$) on the basis of a class (bin (bins)), to generate a histogram.

It is to be noted that the light received during the light reception time period $t_m$ by the light reception section 302 is not limited to the reflected light originating from the light emitted from the light source section 301 and reflected by the measurement target. For example, also ambient light around the distance measurement apparatus 300 (light reception section 302) is received by the light reception section 302.

FIG. 2 is a view depicting a histogram of an example based on time at which the light reception section 302 receives light, which histogram can be applied to the embodiments. Referring to FIG. 2, the axis of abscissa indicates a bin, and the axis of ordinate indicates a frequency for each bin. The bin is a class when a light reception time period $t_m$ is classified for each predetermined unit time period d. In particular, the bin #0 corresponds to $0 \le t_m < d$; the bin #1 corresponds to $d \le t_m < 2 \times d$; the bin #2 corresponds to $2 \times d \le t_m < 3 \times d$; . . . ; and the bin #(N−2) corresponds to $(N-2) \times d \le t_m < (N-1) \times d$. Where the exposure time period of the light reception section 302 is the time period $t_{ep}$, $t_{ep} = N \times d$ holds.

The distance measurement apparatus 300 counts the number of times by which the light reception time period $t_m$ is acquired, on the basis of the bins, to determine a frequency 310 for each bin and generate a histogram. Here, the light reception section 302 also receives light other than reflected light when light emitted from the light source section 301 is reflected. As an example of such light that becomes a target and that is other than reflected light, ambient light described hereinabove is available. A portion of the histogram indicated by a range 311 includes ambient light components by ambient light. The ambient light is light incident at random to the light reception section 302 and becomes noise to the reflected light that is a target.

On the other hand, reflected light that becomes a target is light received according to a specific distance and appears as an active light component 312 in the histogram. A bin corresponding to the frequency of a peak in the active light component 312 is a bin corresponding to the distance D of the measurement target 303. The distance measurement apparatus 300 can calculate the distance D to the measurement target 303 according to the expression (1) given hereinabove, by acquiring representative time of the bin (for example, middle time in the bin) as the time $t_1$ described hereinabove. By using plural light reception results in the manner described above, appropriate distance measurement can be executed against random noise.

Figure 3:
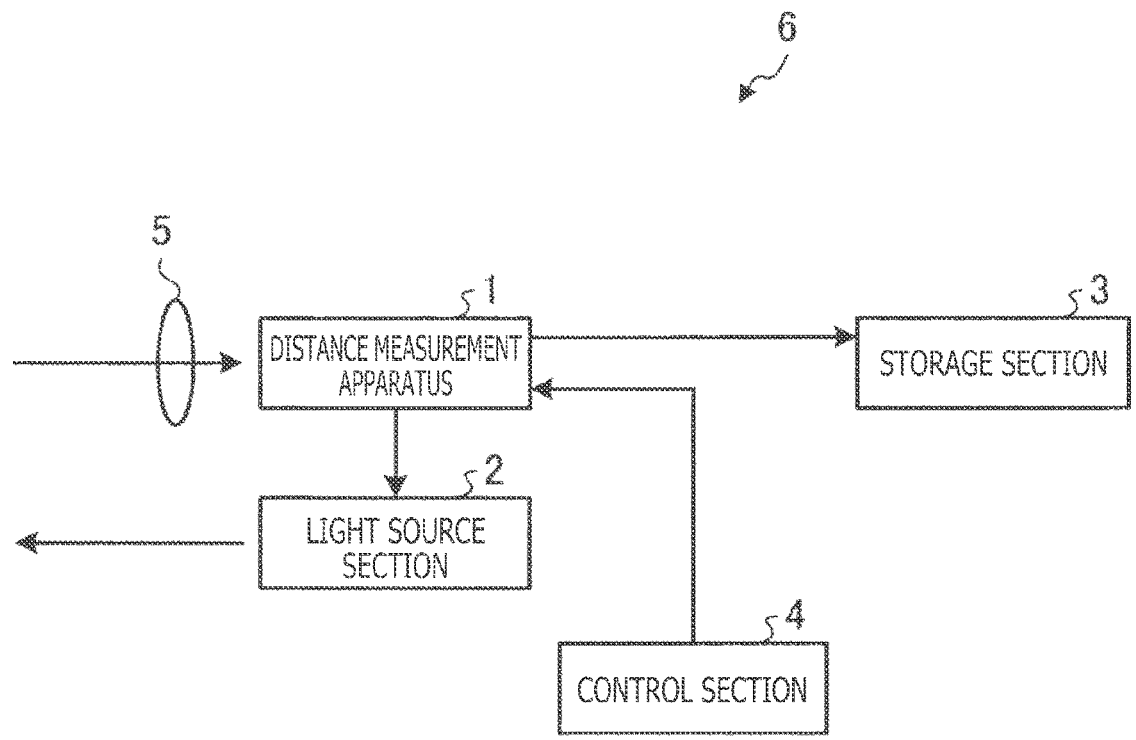
FIG. 3 is a block diagram depicting a configuration of an example of electronic equipment for which a distance measurement apparatus according to the embodiments is used.

FIG. 3 is a block diagram depicting a configuration of an example of electronic equipment that uses a distance measurement apparatus according to the embodiments. Referring to FIG. 3, the electronic equipment 6 includes a distance measurement apparatus 1, a light source section 2, a storage section 3, a control section 4 and an optical system 5.

The light source section 2 corresponds to the light source section 301 described hereinabove and is a laser diode that is driven to emit laser light, for example, in a pulsed form. In the light source section 2, a VCSEL (Vertical Cavity Surface Emitting LASER) that emits laser light can be applied as a surface light source. This is not restrictive, and as the light source section 2, a configuration which uses an array in which laser diodes are arrayed on a line such that laser light emitted from the laser diode array is scanned in a direction perpendicular to the line may be applied. Also it is possible to apply another configuration that uses a laser diode as a single light source such that laser light emitted from the laser diode is scanned in horizontal and vertical directions.

The distance measurement apparatus 1 includes, corresponding to the light reception section 302 described hereinabove, plural light reception elements. The plural light reception elements are arrayed, for example, in a two-dimensional grid pattern to form a light reception face. The optical system 5 introduces light incident from the outside to the light reception face included in the distance measurement apparatus 1.

The control section 4 controls overall operation of the electronic equipment 6. For example, the control section 4 supplies a light emission trigger that is a trigger for causing the light source section 2 to emit light, to the distance measurement apparatus 1. The distance measurement apparatus 1 causes the light source section 2 to emit light at a timing based on the light emission trigger and stores time $t_0$ indicative of the light emission timing. Further, the control section 4 performs setting of a pattern for distance measurement to the distance measurement apparatus 1 in response to an instruction, for example, from the outside.

The distance measurement apparatus 1 counts the number of times, by which time information (light reception time period $t_m$) indicative of a timing at which light is received by the light reception face, within a predetermined time range and obtains a frequency for each bin, to generate a histogram described hereinabove. The distance measurement apparatus 1 further calculates a distance D to the measurement target on the basis of the generated histogram. Information indicative of the calculated distance D is stored into the storage section 3.

Figure 4:
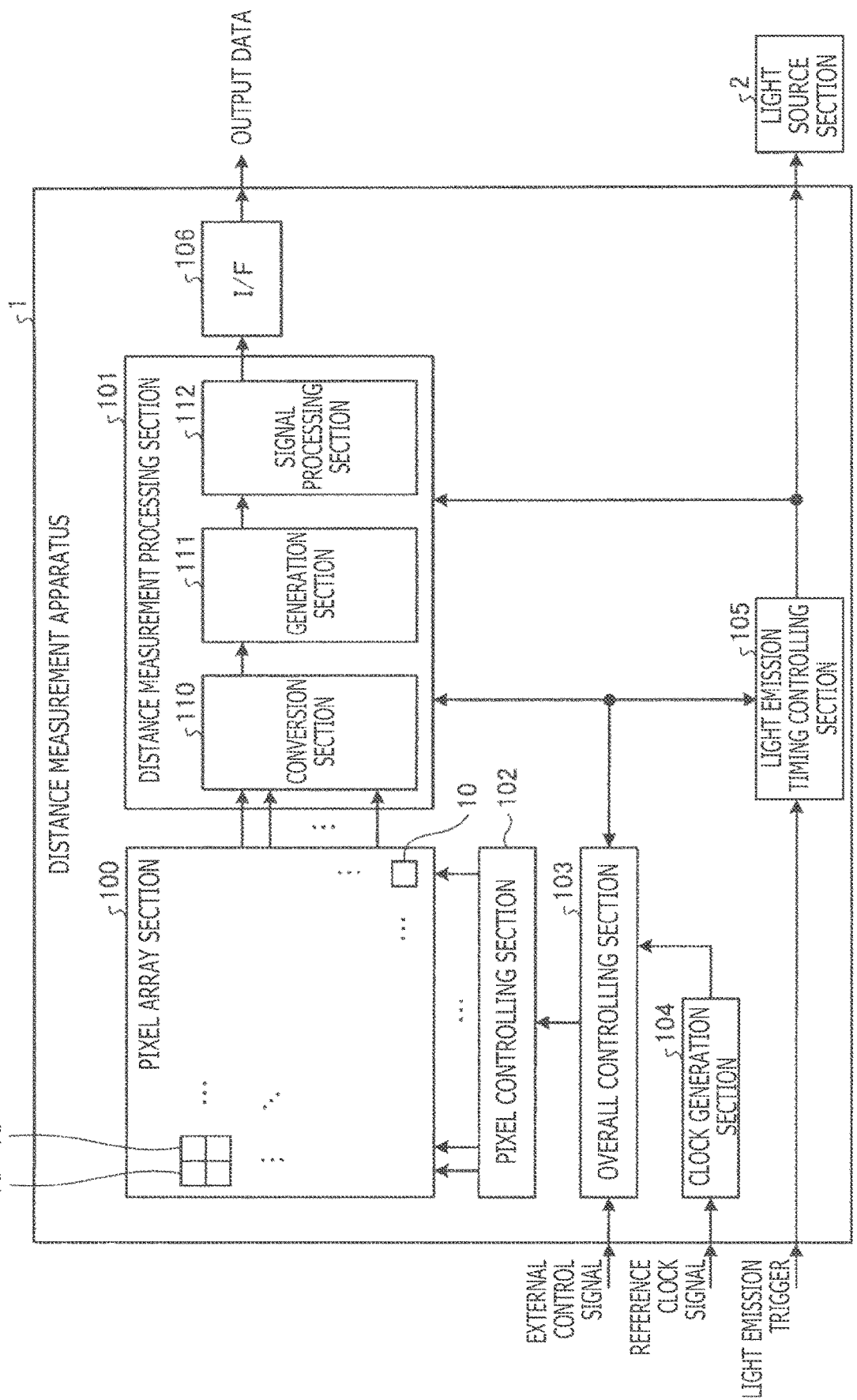
FIG. 4 is a block diagram more particularly depicting a configuration of an example of the distance measurement apparatus that can be applied to the embodiments.

FIG. 4 is a block diagram more particularly depicting a configuration of an example of the distance measurement apparatus 1 that can be applied to the embodiments. Referring to FIG. 4, the distance measurement apparatus 1 includes a pixel array section 100, a distance measurement processing section 101, a pixel controlling section 102, an overall controlling section 103, a clock generation section 104, a light emission timing controlling section 105, and an interface (I/F) 106. The pixel array section 100, the distance measurement processing section 101, the pixel controlling section 102, the overall controlling section 103, the clock generation section 104, the light emission timing controlling section 105, and the interface (I/F) 106 are arranged, for example, on a single semiconductor chip.

Referring to FIG. 4, the overall controlling section 103 controls operation of the entire distance measurement apparatus 1, for example, in accordance with a program incorporated therein in advance. Further, the overall controlling section 103 can also execute control according to an external controlling signal supplied from the outside. The clock generation section 104 generates one or more clock signals to be used in the distance measurement apparatus 1, on the basis of a reference clock signal supplied from the outside. The light emission timing controlling section 105 generates a light emission controlling signal indicative of a light emission timing according to a light emission trigger signal supplied from the outside. The light emission controlling signal is supplied to the light source section 2 and also to the distance measurement processing section 101.

The pixel array section 100 includes plural pixels 10, 10, and so on arrayed in a two-dimensional grid pattern and each including a light reception element. Operation of each pixel 10 is controlled by the pixel controlling section 102 following an instruction of the overall controlling section 103. For example, the pixel controlling section 102 can control reading out of pixel signals from the pixels 10 for each block including (p×q) pixels 10 including p pixels in the row direction and q pixels in the column direction. Further, the pixel controlling section 102 can scan the pixels 10 in the row direction and further in the column direction in units of the block, to read out a pixel signal from the pixels 10. This is not restrictive, and the pixel controlling section 102 can also control the individual pixels 10 independently. Further, the pixel controlling section 102 can determine a predetermined region of the pixel array section 100 as a target region and determine pixels 10 included in the target region as pixels 10 of a target for reading out a pixel signal. Further, the pixel controlling section 102 can also scan plural rows (plural lines) collectively and further scan them in the column direction, to read out a pixel signal from the pixels 10.

A pixel signal read out from each pixel 10 is supplied to the distance measurement processing section 101. The distance measurement processing section 101 includes a conversion section 110, a generation section 111, and a signal processing section 112.

A pixel signal read out from each pixel 10 and outputted from the pixel array section 100 is supplied to the conversion section 110. Here, pixel signals are read out asynchronously from the pixels 10 and supplied to the conversion section 110. In particular, a pixel signal is read out from a light reception element and outputted according to a timing at which light is received by each pixel 10.

The conversion section 110 converts the pixel signal supplied from the pixel array section 100 into digital information. In particular, the pixel signal supplied from the pixel array section 100 is outputted corresponding to a timing at which light is received by the light reception element included in the pixel 10 to which the pixel signal corresponds. The conversion section 110 converts the pixel signal supplied thereto into time information indicative of the timing.

The generation section 111 generates a histogram on the basis of the time information into which the pixel signals are converted by the conversion section 110. Here, the generation section 111 counts the time information on the basis of a unit time period d set by a setting section 113, to generate a histogram. Details of a histogram generation process by the generation section 111 are described later.

The signal processing section 112 performs a predetermined calculation process on the basis of data of the histogram generated by the generation section 111, to calculate, for example, distance information. The signal processing section 112 generates a curve approximation of the histogram, for example, on the basis of the data of the histogram generated by the generation section 111. The signal processing section 112 detects a peak of the curve to which the histogram is approximated and can calculate the distance D on the basis of the detected peak.

When curve approximation of the histogram is to be performed, the signal processing section 112 can perform a filter process for the curve to which the histogram is approximated. For example, the signal processing section 112 can reduce noise components by performing a low pass filter process for the curve to which the histogram is approximated.

The distance information calculated by the signal processing section 112 is supplied to the interface 106. The interface 106 outputs the distance information supplied from the signal processing section 112 as output data to the outside. As the interface 106, for example, the MIPI (Mobile Industry Processor Interface) can be applied.

It is to be noted that, although the foregoing description describes that distance information obtained by the signal processing section 112 is outputted to the outside through the interface 106, this is not restrictive. In other words, a configuration which outputs histogram data, which is data of a histogram generated by the generation section 111, from the interface 106 to the outside may be applied. In this case, from distance measurement condition information set by the setting section 113, information indicative of a filter coefficient can be omitted. The histogram data outputted from the interface 106 is supplied, for example, to an external information processing apparatus, and is suitably processed.

Figure 5:
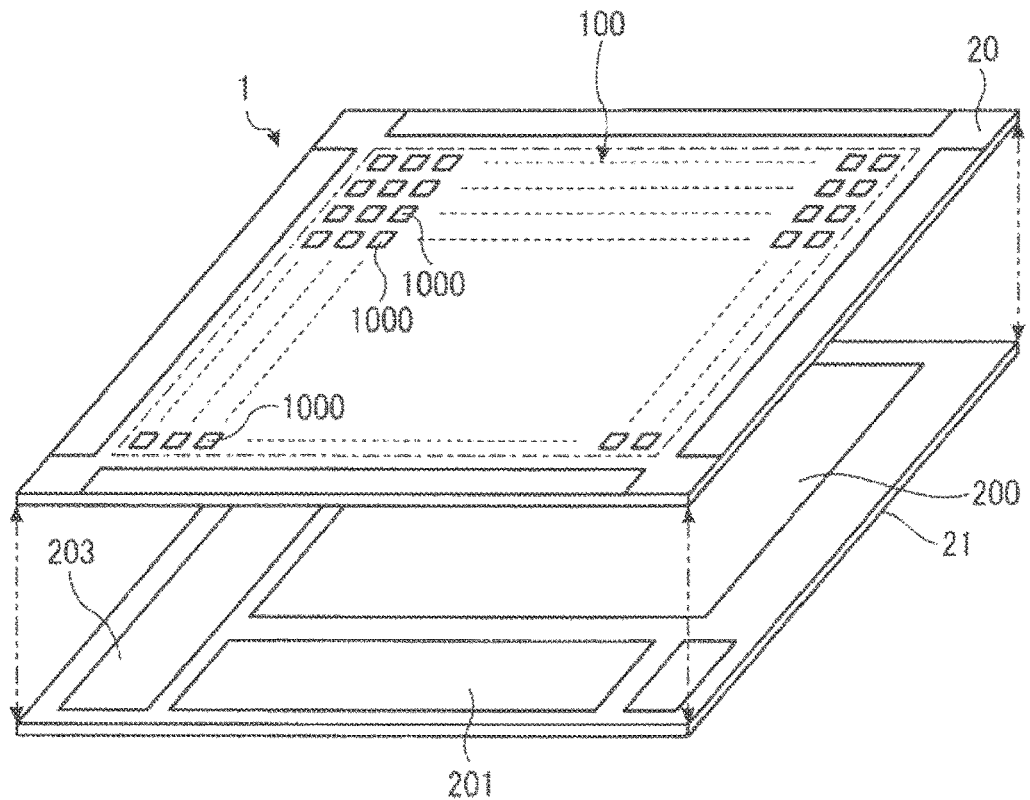
FIG. 5 is a schematic view depicting an example of a configuration of a device that can be applied to the distance measurement apparatus according to the embodiments.

FIG. 5 is a schematic view depicting an example of a configuration of a device that can be applied to the distance measurement apparatus 1 according to the embodiments. Referring to FIG. 5, the distance measurement apparatus 1 is configured such that a light reception chip 20 and a logic chip 21 each including a semiconductor chip are stacked one on another. It is to be noted that, in FIG. 5, the light reception chip 20 and the logic chip 21 are depicted in a separated state for illustration.

In the light reception chip 20, light reception elements 1000 included in plural pixels 10 are arrayed in a two-dimensional grid pattern in a region of the pixel array section 100. In the logic chip 21, a logic array section 200 which includes a signal processing section that processes signals acquired by the light reception elements 1000 is provided. In the logic chip 21, a signal processing circuit section 201 that performs processing of signals acquired by the light reception elements 1000 and an element controlling section 203 that controls operation as the distance measurement apparatus 1 can be additionally provided adjacent to the logic array section 200.

For example, the signal processing circuit section 201 can include the distance measurement processing section 101 described hereinabove. Further, the element controlling section 203 can include the pixel controlling section 102, the overall controlling section 103, the clock generation section 104, the light emission timing controlling section 105, and the interface 106 described hereinabove.

It is to be noted that the configurations on the light reception chip 20 and the logic chip 21 are not limited to those of this example. Further, the element controlling section 203 can be arranged, for example, in the proximity of the light reception elements 1000 for the purpose of driving and control in addition to the control of the logic array section 200. The element controlling section 203 can be provided, in addition to the manner of arrangement depicted in FIG. 5, in any region of the light reception chip 20 and the logic chip 21 such that it has any function.

Figure 6:
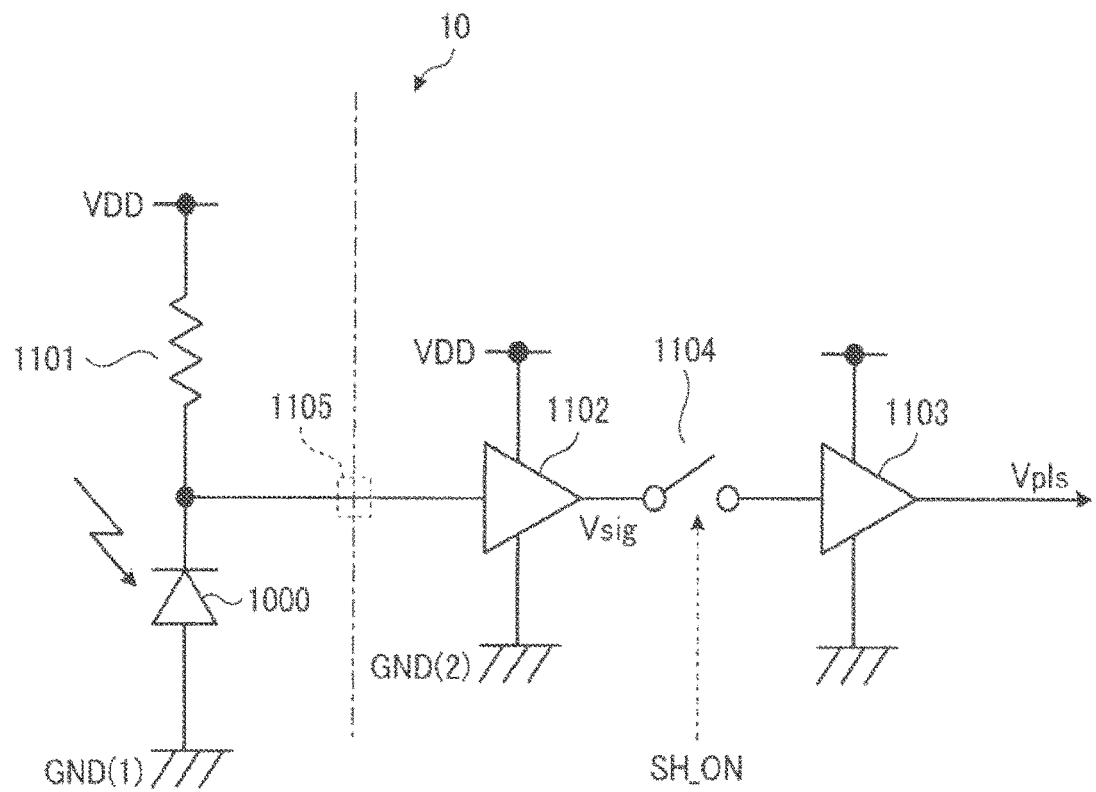
FIG. 6 is a view depicting a configuration of an example of a pixel that can be applied to the embodiments.

FIG. 6 is a view depicting a configuration of an example of the pixel 10 that can be applied to the embodiments. Referring to FIG. 6, the pixel 10 includes a light reception element 1000, a resistor 1101, an inverter 1102, an amplifier 1103, and a switch 1104.

The light reception element 1000 converts light incident thereto into an electric signal by photoelectric conversion and outputs the electric signal. In the embodiments, the light reception element 1000 converts a photon (photon) incident thereto into an electric signal by photoelectric conversion and outputs a pulse according to the incidence of the photon. In the embodiments, as the light reception element 1000, a single photon avalanche diode is used. The single photon avalanche diode is hereinafter referred to as a SPAD (Single Photon Avalanche Diode). The SPAD has such a characteristic that, if a high negative voltage that causes avalanche multiplication is kept being applied to the cathode thereof, then an electron generated according to incidence of one photon gives rise to avalanche multiplication and large current flows. By using this characteristic of the SPAD, incidence of one photon can be detected with high sensitivity.

Referring to FIG. 6, the light reception element 1000 that is a SPAD is connected at the cathode thereof to a terminal of a power supply potential VDD through the resistor 1101 and at the anode thereof to a terminal of a potential GND(1) that is lower in potential than the power supply potential VDD. The terminal of the potential GND(1) is, for example, a ground terminal or a terminal of a predetermined negative voltage. Consequently, a reverse bias is applied to the light reception element 1000. Further, photocurrent flows in a direction from the cathode toward the anode of the light reception element 1000.

It is to be noted that the light reception element 1000 is not limited to the SPAD. It is also possible to apply, as the light reception element 1000, an avalanche photodiode (APD) and an ordinary photodiode.

The resistor 1101 is connected at one end thereof to the power supply potential VDD and at the other end thereof to the cathode of the light reception element 1000. Every time incidence of a photon is detected by the light reception element 1000, photocurrent flows to the resistor 1101, and the cathode potential of the light reception element 1000 drops to a value in an initial state that is lower than the power supply potential VDD (quenching operation).

A signal extracted from the junction of the resistor 1101 and the cathode of the light reception element 1000 is inputted to the inverter 1102. The inverter 1102 inverts the signal of the cathode potential of the light reception element 1000 inputted thereto and supplies a resulting inverted output signal Vsig to the amplifier 1103 through the switch 1104 that is controlled between on and off by a control signal SH_ON. The amplifier 1103 shapes and outputs the inverted output signal Vsig into and as a pulse Vpls. Meanwhile, the potential GND(2) on the ground side to which the inverter 1102 and the amplifier 1103 are connected is different from the potential GND(1) on the ground side to which the anode of the light reception element 1000 is connected.

It is to be noted that, although, in FIG. 6, outputting of the inverted output signal Vsig is controlled between on and off with the control signal SH_ON, this example is not restrictive. In particular, the control signal SH_ON may control a different function if it can stop outputting of the pulse Vpls from the pixel 10. For example, supply of the power of the power supply potential VDD to be supplied to the pixel 10 may be controlled between on and off with the control signal SH_ON.

Further, in FIG. 6, the light reception element 1000 and the resistor 1101 are formed on the light reception chip 20. Meanwhile, the inverter 1102, the amplifier 1103, and the switch 1104 are formed on the logic chip 21. The junction of the resistor 1101 and the cathode of the light reception element 1000 and the input end of the inverter 1102 are connected to each other between the light reception chip 20 and the logic chip 21, for example, through a coupling portion 1105 by CCC (Copper-Copper Connection) or the like.

(Example of Scanning Method of Pixel Array According to Existing Technology)

Figure 7A:
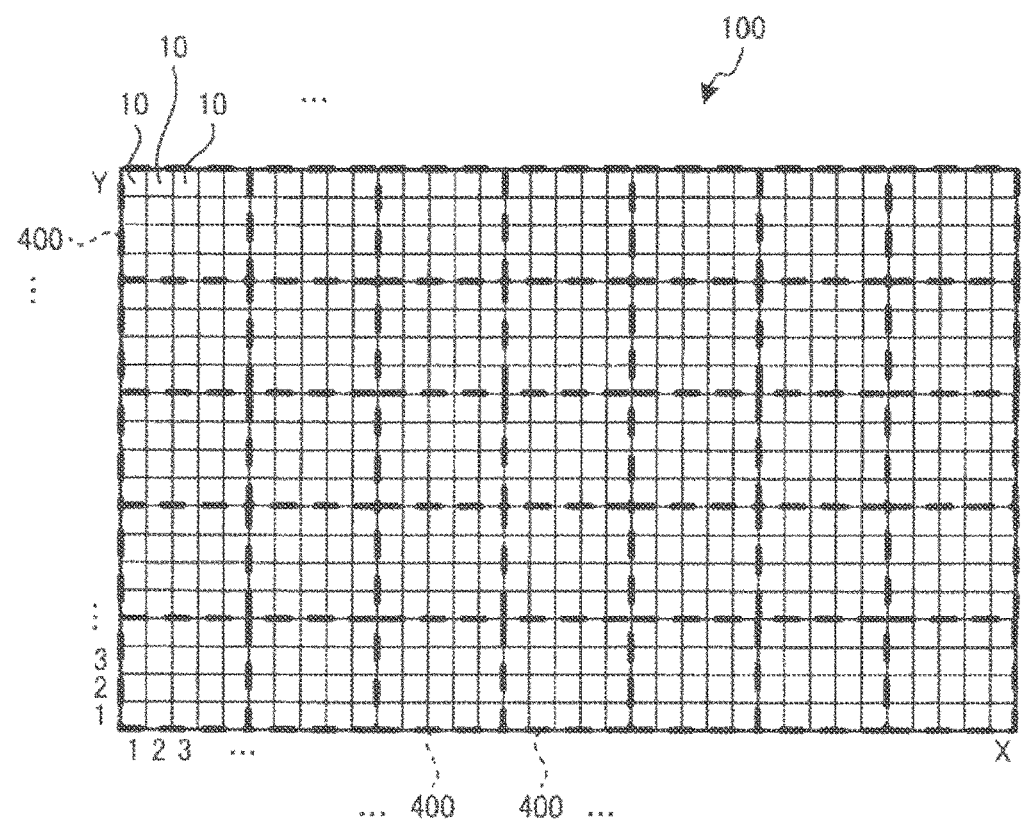
FIG. 7A is a view depicting an example of a scanning method of a pixel array section according to an existing technology.
Figure 7B:
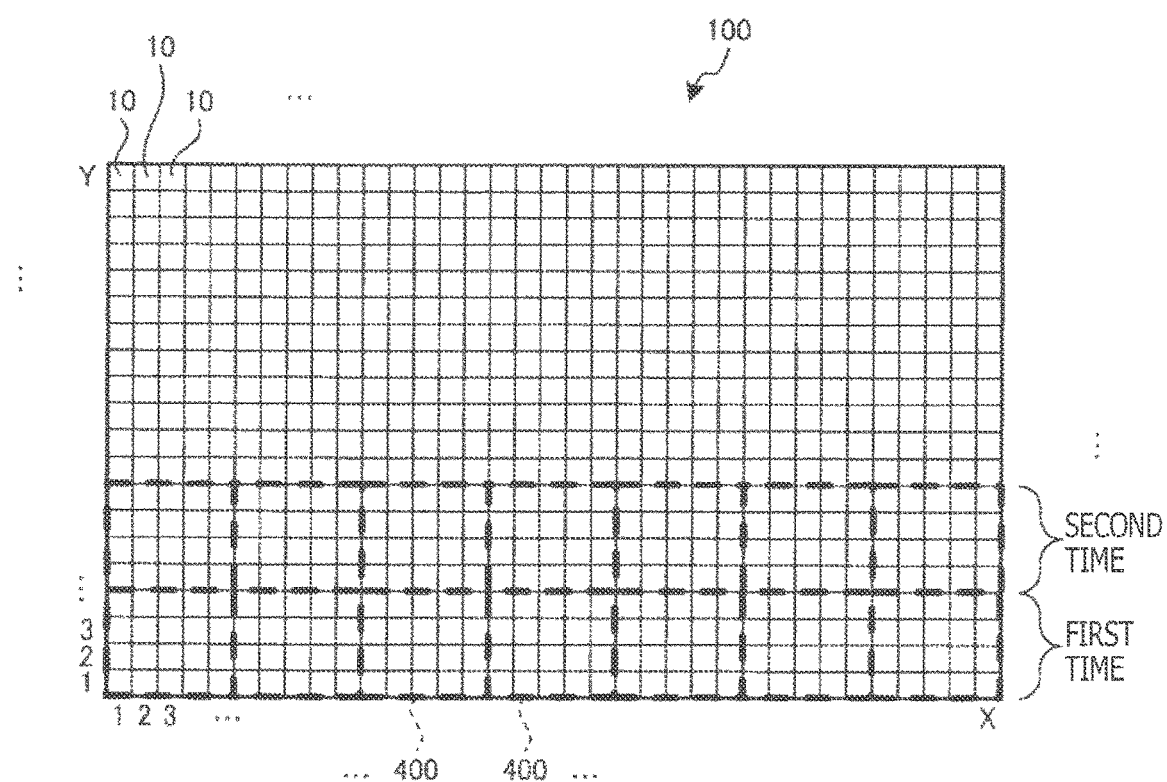
FIG. 7B is a view depicting another example of the scanning method of the pixel array section according to the existing technology.

Now, prior to the description of the present disclosure, a scanning method of the pixel array section 100 according to an existing technology is roughly described. FIGS. 7A and 7B are views depicting examples of a scanning method of the pixel array section 100 according to an existing technology.

For example, referring to FIG. 7A, the pixel array section 100 has a size of X pixels (for example, 600 pixels)×Y lines (for example, 200 lines) and is configured such that a total of (X×Y) pixels 10 are arrayed in a two-dimensional grid pattern in X pixels and Y lines in the horizontal direction and the vertical direction in FIG. 7A. Further, in the example of FIG. 7A, distance measurement of the pixels 10 in the pixel array section 100 is performed for each block 400 of p pixels×q pixels (for example, 5 pixels×4 pixels). More particularly, for each block 400, a distance measurement process including exposure, photon detection, histogram generation, and peak detection is performed for each of the pixels 10 included in the block 400. In other words, the block 400 is an addition unit with which the number of light reception time periods $t_m$ is added upon histogram generation.

As depicted in FIG. 7A, in a case where a distance measurement process is executed at the same time for the blocks 400 in the overall area of the pixel array section 100, there are constraints in terms of power consumption, a communication band for data, a circuit scale and so forth. Thus, it has been proposed to divide the pixel array section 100 into plural regions and perform a distance measurement process sequentially for the divided regions.

FIG. 7B is a view schematically depicting execution of a distance measurement process where the pixel array section 100 is divided into plural regions. As depicted in FIG. 7B, the pixel array section 100 is divided into regions according to the height of the block 400 in the vertical direction, and a distance measurement process is executed for each of the divided regions. Each of regions into which the pixel array section 100 is divided in the vertical direction according to the height of the block 400 is hereinafter referred to as a row of the blocks 400, or simply as a "row." In the description given below, unless otherwise specified, the term "row" signifies this row of the blocks 400.

Referring to FIG. 7B, if a distance measurement process for a row at the lower end of the pixel array section 100 ends (first time), then a distance measurement process is executed for the blocks 400 in a row immediately above the first-mentioned row (second time). Thereafter, the pixel array section 100 is scanned in the horizontal direction in a unit of the blocks 400 to perform a distance measurement process similarly, and this scanning in a unit of a row is sequentially executed for rows adjacent to each other in the vertical direction. The method of sequentially executing scanning in a unit of a row in the vertical direction for the overall pixel array section 100 is called rolling scanning. By executing the rolling scanning, the power consumption per unit time and the communication band for data can be reduced, and the circuit scale can be reduced.

However, according to the existing technology, time is required after a distance measurement process is executed for a row at the lower end of the pixel array section 100 until a distance measurement process is executed for a row at the upper end of the pixel array section 100, and there is a possibility that the simultaneity in distance measurement over the overall pixel array section 100 is impaired. For example, in such a case that a mobile body is a measurement target or an apparatus for performing distance measurement is itself mounted on a mobile body, it is difficult to acquire distance measurement information of high accuracy.

First Embodiment

Figure 8:
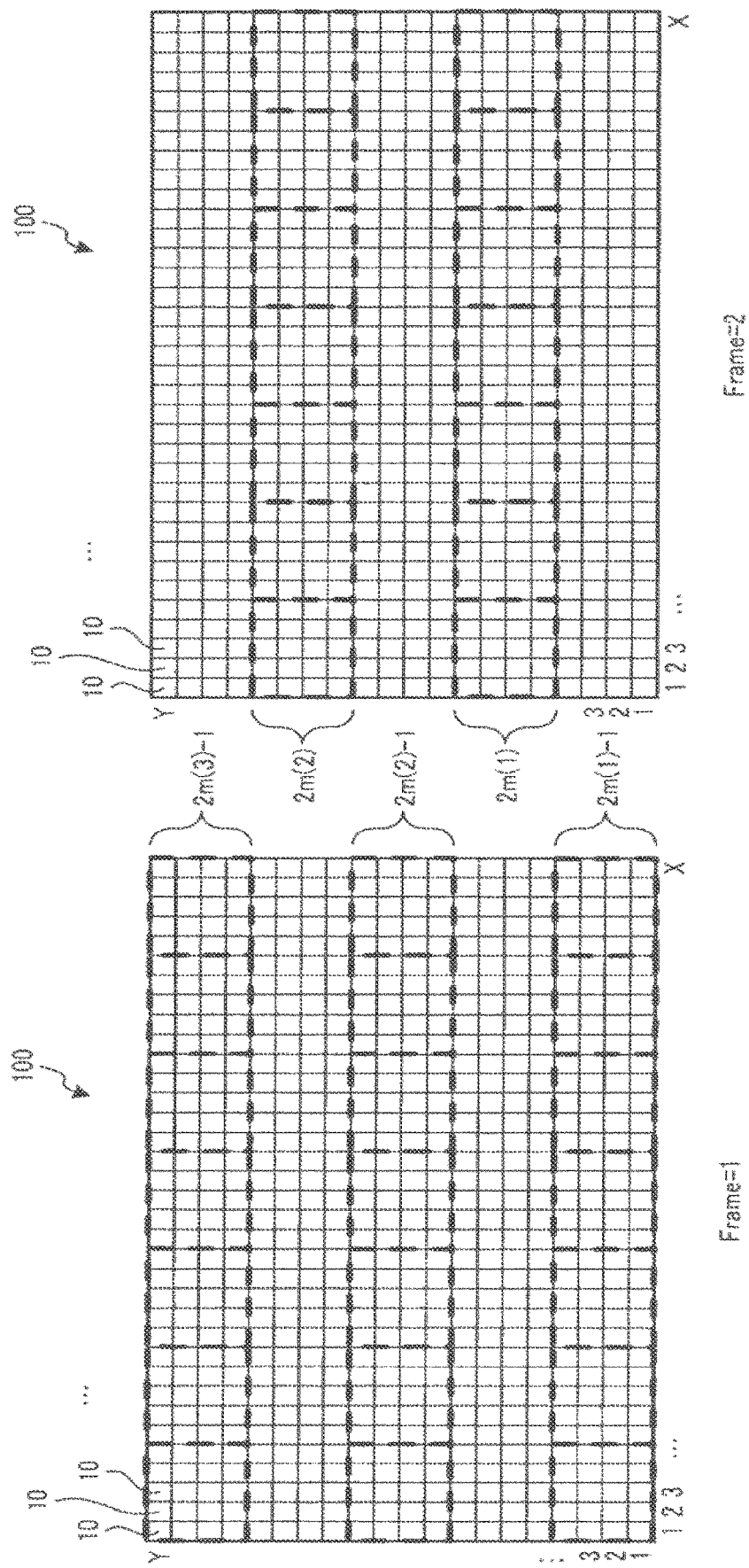
FIG. 8 is a view illustrating a scanning method in the distance measurement apparatus according to the first embodiment.

Now, a first embodiment of the present disclosure is described. In the first embodiment of the present disclosure, an interlace scanning method is applied to pixels 10 included in a pixel array section 100. FIG. 8 is a view for illustrating a scanning method in a distance measurement apparatus 1 according to the first embodiment. It is to be noted that FIG. 8 corresponds to FIG. 7A described hereinabove and that the pixel array section 100 has a size of X pixels×Y pixels and is configured such that a total of (X×Y) pixels 10 are arrayed in a two-dimensional grid pattern so that X and Y pixels 10 are included respectively in a horizontal direction and a vertical direction in FIG. 8. Further, in the example of FIG. 8, the pixels 10 in the pixel array section 100 perform distance measurement for each block 400 of p pixels×q pixels (for example, 5 pixels×4 pixels). The block 400 is an addition unit with which the number of light reception time periods $t_m$ is added upon generation of a histogram.

Further, in the following description, unless otherwise specified, it is assumed that all pixels 10 included in the pixel array section 100 configure a target region that is a target for reading out a pixel signal.

Referring first to the left side in FIG. 8, the distance measurement apparatus 1 according to the first embodiment determines one row (first row), for example, at the lower end of the pixel array section 100, as a scanning range, and performs scanning of the scanning range to perform a distance measurement process for each block 400. Then, the distance measurement apparatus 1 determines, skipping the second row of the pixel array section 100, the third row as a scanning range and performs scanning of the scanning range to perform a distance measurement process for each block 400 in the scanning range. The distance measurement apparatus 1 thereafter performs scanning of the odd-numbered rows by similarly skipping the even-numbered rows. In particular, where m=1, 2, 3, . . . holds, the distance measurement apparatus 1 sequentially executes scanning of the (2m−1)th rows. The period from start to finish of scanning of the odd-numbered rows is defined as a first frame (Frame) period.

After the distance measurement process for the odd-numbered rows during the first frame period ends, scanning of the even-numbered rows of the pixel array section 100 is executed. In particular, referring to the right side in FIG. 8, the distance measurement apparatus 1 determines, for example, the second row from the lower end of the pixel array section 100, as a scanning range, and scans the scanning range to perform distance measurement for each block 400 in the scanning range. Then, the distance measurement apparatus 1 determines, skipping the third row of the pixel array section 100, the fourth row as a scanning range and performs scanning of the scanning range to perform a distance measurement process for each block 400 in the scanning range. Thereafter, the distance measurement apparatus 1 performs scanning of the even-numbered rows by similarly skipping the odd-numbered rows. In particular, where m=1, 2, 3, . . . holds, the distance measurement apparatus 1 sequentially executes scanning of the (2m)th rows. This period from start to end of scanning of the even-numbered rows is defined as a second frame period.

In the first embodiment, rows for which scanning is performed do not overlap between the first frame period and the second frame period, as described above. In other words, it can be considered that a first light reception element group that is a set of pixels 10 that are read out during the first frame period does not include any pixel 10 included in a second light reception element group that is a set of pixels 10 that are read out during the second frame period and that the sum set of the first light reception element group and the second light reception element group includes a light reception element group including all pixels 10 included in a target region that becomes a distance measurement target in the pixel array section 100.

Figure 9:
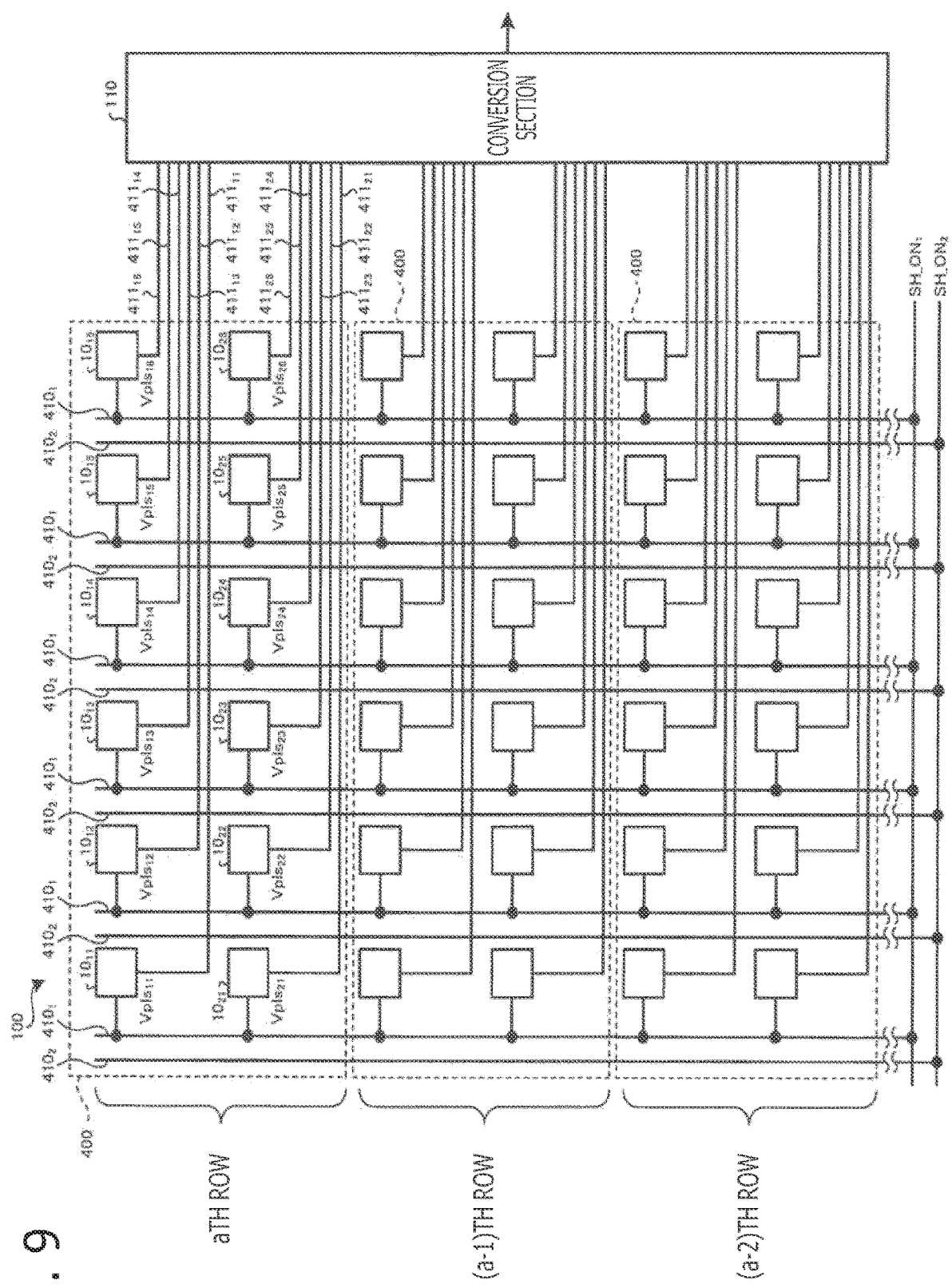
FIG. 9 is a view depicting a configuration of a first example of a pixel array section according to the first embodiment, focusing on wiring lines for pixels.

FIG. 9 is a view depicting a configuration of a first example of the pixel array section 100 according to the first embodiment, focusing on wiring lines for the pixels 10. It is to be noted that, in FIG. 9, the height of one row is two pixels (two lines) and the blocks 400 have a size of 6 pixels×2 pixels (two lines) for the convenience of description.

Referring to FIG. 9, it is assumed that the value "a" is an odd-number value equal to or greater than three and the (a−2)th row, the (a−1)th row, and the ath row are defined from the bottom. In this case, for example, the ath row and the (a−2)th row are odd-numbered rows and the (a−1)th row is an even-numbered row. Focusing on the ath row among them, description is given taking, as an example, the pixels $10_1$, $10_2$, $10_3$, $10_4$, $10_5$, and $10_6$ and the pixels $10_{21}$, $10_{22}$, $10_{23}$, $10_{24}$, $10_{25}$, and $10_{26}$ individually included in a block 400.

Pulses $Vpls_{11}$, $Vpls_{12}$, $Vpls_{13}$, $Vpls_{14}$, $Vpls_{15}$, and $Vpls_{11}$ outputted from the pixels $10_{11}$, $10_{12}$, $10_{13}$, $10_{14}$, $10_{15}$, and $10_{16}$ of a line on the upper stage of the block 400 in the ath row are supplied to the conversion section 110 in the distance measurement processing section 101 (not depicted) through signal lines $411_{11}$, $411_{12}$, $411_{13}$, $411_{14}$, $411_{15}$, and $411_{16}$, respectively.

Also the pixels $10_{21}$ to $10_{26}$ of a line on the lower stage of the block 400 in the ath row are similar to the pixels $10_{11}$ to $10_{16}$ described above. In particular, pulses $Vpls_{21}$ to $Vpls_{26}$ outputted from the pixels $10_{21}$ to $10_{26}$ are inputted to the conversion section 110 through signal lines $411_{21}$ to $411_{26}$, respectively.

The conversion section 110 outputs digital values individually corresponding to time periods during which the pulses $Vpls_{11}$ to $Vpls_{16}$ and the pulses $Vpls_{21}$ to $Vpls_{26}$ are supplied from the signal lines $411_{11}$ to $411_{16}$ and the signal lines $411_{21}$ to $411_{26}$, respectively.

On the other hand, for each row, control lines $410_1$ and $410_2$ are provided in a vertical direction (column direction). The control lines $410_1$ are connected, for example, to the pixels $10_{11}$ to $10_{16}$ and the pixels $10_{21}$ to $10_{26}$ in the blocks 400 of the odd-numbered rows (in the example of FIG. 9, the ath row and the (a−2)th row). Meanwhile, the control lines $410_2$ are connected, for example, to the pixels $10_{11}$ to $10_{16}$ and the pixels $10_{21}$ to $10_{26}$ in the blocks 400 of the even-numbered rows (in the example of FIG. 9, the (a−1)th row).

Along the control lines $410_1$ and $410_2$, control signals for controlling measurement operation of the pixels $10_{11}$ to $10_{16}$ and the pixels $10_{21}$ to $10_{26}$ connected respectively thereto are transmitted. For example, for the control signals, a control signal SH_ON for controlling on/off of the switch 1104 (refer to FIG. 6) can be used. In the example of FIG. 9, a control signal $SH\_ON_1$ is supplied to the pixels $10_{11}$ to $10_{16}$ and the pixels $10_{21}$ to $10_{26}$ in the blocks 400 of the odd-numbered rows through the control line $410_1$. Meanwhile, a control signal $SH\_ON_2$ is supplied to the pixels $10_{11}$ to $10_{16}$ and the pixels $10_{21}$ to $10_{26}$ in the blocks 400 of the even-numbered rows through the control line $410_2$.

The control signals $SH\_ON_1$ and $SH\_ON_2$ are generated by the pixel controlling section 102, for example, in response to an instruction of the overall controlling section 103 and are supplied to the pixel array section 100 (refer to FIG. 4). The pixel controlling section 102 outputs the control signal $SH\_ON_1$, which controls the switch 1104 to turn on during the first period and to turn off during the second period, to the control line $410_1$. Further, the pixel controlling section 102 outputs the control signal $SH\_ON_2$, which controls the switch 1104 to turn off during the first period and to turn on during the second period, to the control line $410_2$. Consequently, what becomes possible is interlace scanning in which the first period and the second period are respectively determined as the first frame period and the second frame period described hereinabove with reference to FIG. 8.

Figure 10:
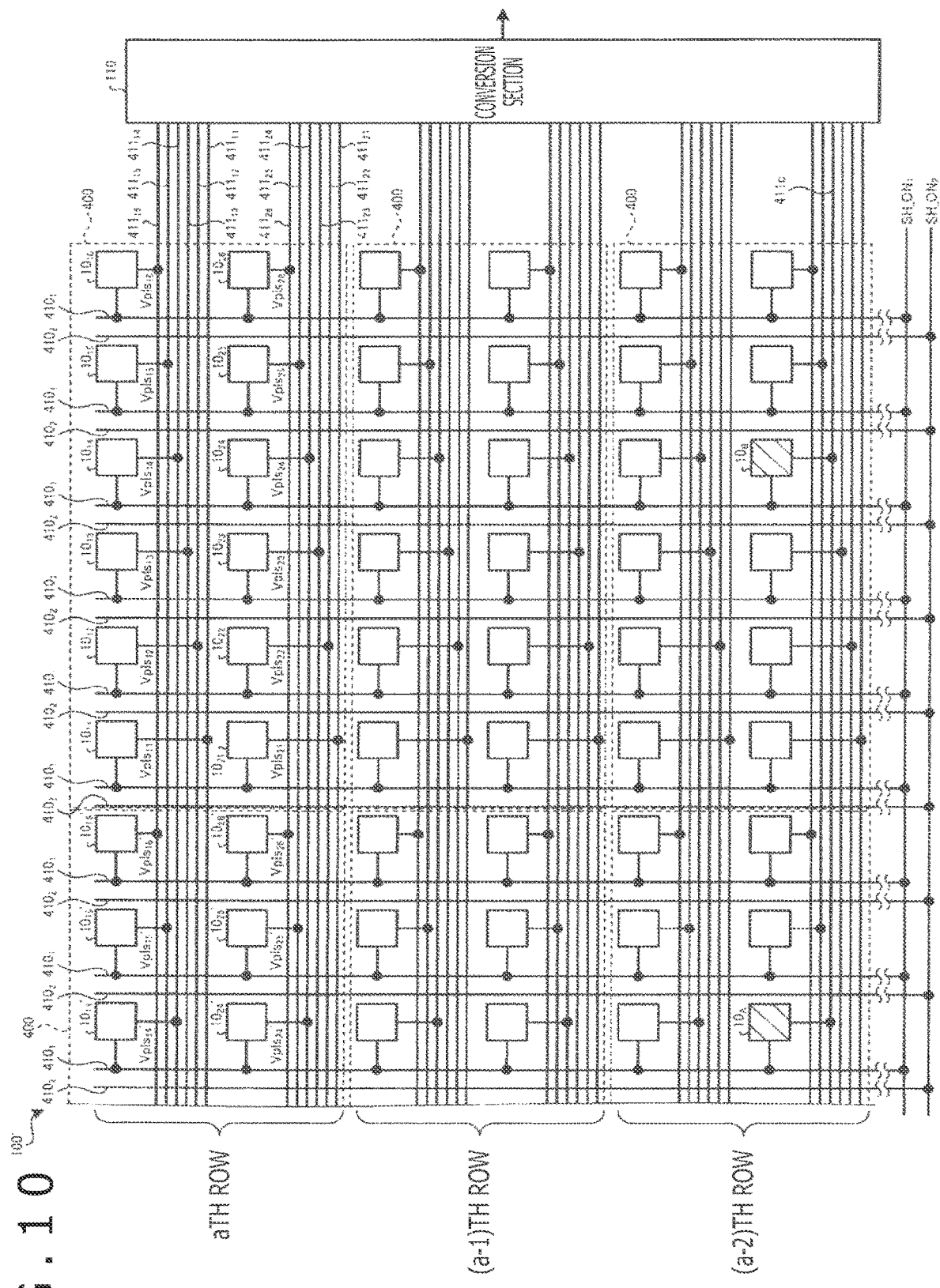
FIG. 10 is a view depicting an example of a configuration of a pixel array section according to a second example of the first embodiment, focusing on a wiring line for each pixel.

FIG. 10 is a view depicting an example of a configuration of a pixel array section 100' according to a second example of the first embodiment, focusing on wiring lines for the pixels 10. It is to be noted that, in FIG. 10, the height of one row is two pixels and the blocks 400 have a size of 6 pixels×2 pixels (two lines) for the convenience of description similarly as in FIG. 9 described hereinabove. In the configuration of FIG. 9 described hereinabove, in the pixel array section 100, the signal lines $411_{11}$, $411_{12}$, and so on are provided for the pixels 10 aligned in the horizontal direction. Thus, the number of wiring lines becomes very great, and a great wiring line area is required.

In contrast, in the configuration depicted in FIG. 10, the signal lines $411_{11}$ to $411_{16}$ and the signal lines $411_{21}$ to $411_{26}$ are shared for each predetermined number of pixels 10 on a line.

In particular, in blocks 400, 400, and so on adjacent to each other in the same row, pulses $Vpls_{16}$, $Vpls_{16}'$, and so on outputted from the pixel $10_{16}$, pixel $10_{16}'$, and so on, respectively, are supplied to the conversion section 110, with the signal line $411_{16}$ shared. In the blocks 400, 400, and so on, pulses $Vpls_{15}$, $Vpls_{15}'$, and so on outputted from the pixel $10_{15}$, pixel $10_{15}'$, and so on, respectively, are supplied to the conversion section 110, with the signal line $411_{15}$ shared. Further, pulses $Vpls_{14}$, $Vpls_{14}'$, and so on outputted from the pixel $10_{14}$, pixel $10_{14}'$, and so on, respectively, are supplied to the conversion section 110, with the signal line $411_{14}$ shared. Also the signal lines $411_{13}$ to $411_{11}$ are similarly shared by individually corresponding pixels 10 in the blocks 400, 400, and so on adjacent to each other in the same row.

Similarly, in the blocks 400, 400, and so on, pulses $Vpls_{26}$, $Vpls_{26}'$, and so on outputted from the pixel $10_{26}$, pixel $10_{26}'$, and so on, respectively, are supplied to the conversion section 110, with the signal line $411_{26}$ shared. Further, in the blocks 400, 400, and so on, pulses $Vpls_{25}$, $Vpls_{25}'$, and so on outputted from the pixel $10_{25}$, pixel $10_{25}'$, and so on, respectively, are supplied to the conversion section 110, with the signal line $411_{25}$ shared. Further, in the blocks 400, 400, and so on, pulses $Vpls_{24}$, $Vpls_{14}'$, and so on outputted from the pixel $10_{24}$, pixel $10_{24}'$, and so on, respectively, are supplied to the conversion section 110, with the signal line $411_{24}$ shared. Also the signal lines $411_{23}$ to $411_{21}$ are similarly shared by individually corresponding pixels 10 in the blocks 400, 400, and so on adjacent to each other in the same row.

Where a signal line for transmitting a pulse Vpls is shared by plural pixels 10 in the manner described above, it is possible to reduce the number of wiring lines for the signal lines and reduce the wiring line area.

In this second example, where pulses Vpls are outputted simultaneously from plural pixels 10 that share a signal line for transmitting a pulse Vpls, it cannot be determined from which one of the plural pixels 10 the pulse Vpls is outputted. As an example, referring to FIG. 10, where a pulse Vpls is supplied from a signal line $411_C$ to the conversion section 110 in the (a−2)th row, it is very difficult to specify from which one of pixels $10_A$ and $10_B$ (each indicated with an oblique line) that share the signal line $411_C$ this pulse Vpls is outputted.

Figure 11:
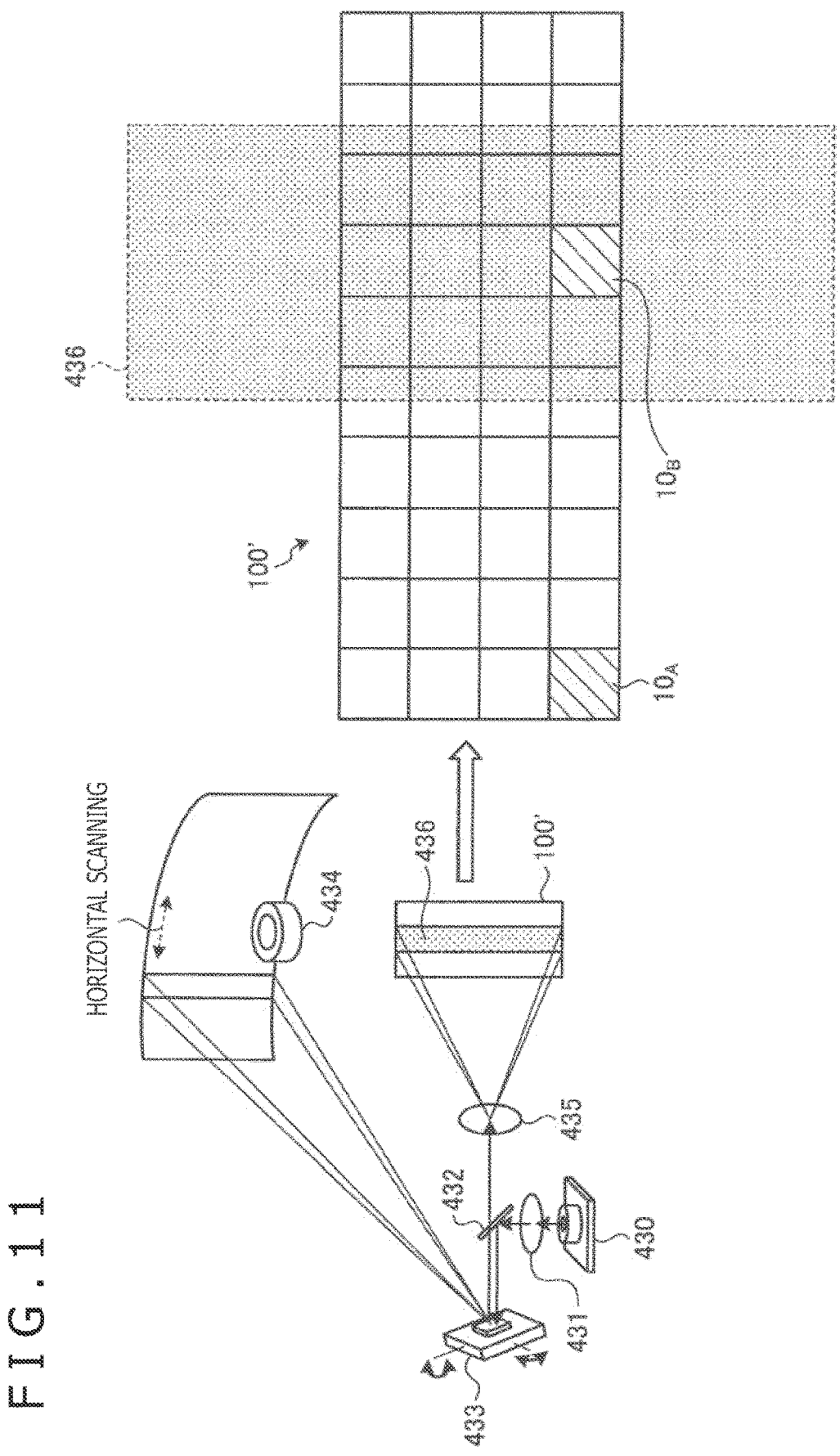
FIG. 11 is a view illustrating scanning of light of a light source section in a horizontal direction, which can be applied to the first embodiment.

This can be solved, for example, by scanning light emitted from the light source section 2 in the horizontal direction. FIG. 11 is a view illustrating scanning of light of the light source section 2 in the horizontal direction, which can be applied to the first embodiment.

On the left side in FIG. 11, an example of a configuration for performing such scanning as just described is depicted. A light source 430 that is, for example, a laser diode, is excited to generate light at a predetermined light emission timing and emits laser light. The laser light emitted from the light source 430 is condensed by a condensing lens 431 and is reflected by a polarizing beam splitter 432 such that it is applied to a micromirror 433. To the micromirror 433, for example, MEMS (Micro Electro Mechanical Systems) can be applied, and by the micromirror 433, the direction of reflected light arising from applied light and reflected can be changed within a predetermined angular range under the control from the outside.

Part of the laser light emitted as reflected light from the micromirror 433 is reflected by a measurement target 434, and the reflected light is applied to the micromirror 433. The reflected light from the measurement target 434 applied to the micromirror 433 is reflected by the micromirror 433 and is applied to the pixel array section 100' through a light receiving lens 435.

Here, the laser light applied from the light source 430 and reflected by the micromirror 433 is shaped using, for example, an aperture in which a slit is provided in the vertical direction, such that it has a shape narrow in the horizontal direction and elongated in the vertical direction and is then applied toward the measurement target 434. Further, the micromirror 433 is driven to scan the light in the horizontal direction. Consequently, the reflected light originating from laser light emitted from the light source 430 and reflected by the measurement target 434 is received solely at a region 436 having a predetermined width in the horizontal direction and being elongated in the vertical direction, by the pixel array section 100'.

In an example of the right side in FIG. 11, the pixel $10_B$ is included in the region 436 and the pixel $10_A$ is outside the region 436. Accordingly, by synchronizing driving for scanning of the micromirror 433 in the horizontal direction and processing by the distance measurement processing section 101 for the pulse Vpls with each other, it can be specified that the pulse Vpls supplied to the distance measurement processing section 101 through the signal line $411_C$ is a signal outputted from the pixel $10_B$.

(Particular Example of Scanning of Rows in Pixel Array Section According to First Embodiment)

Figure 12:
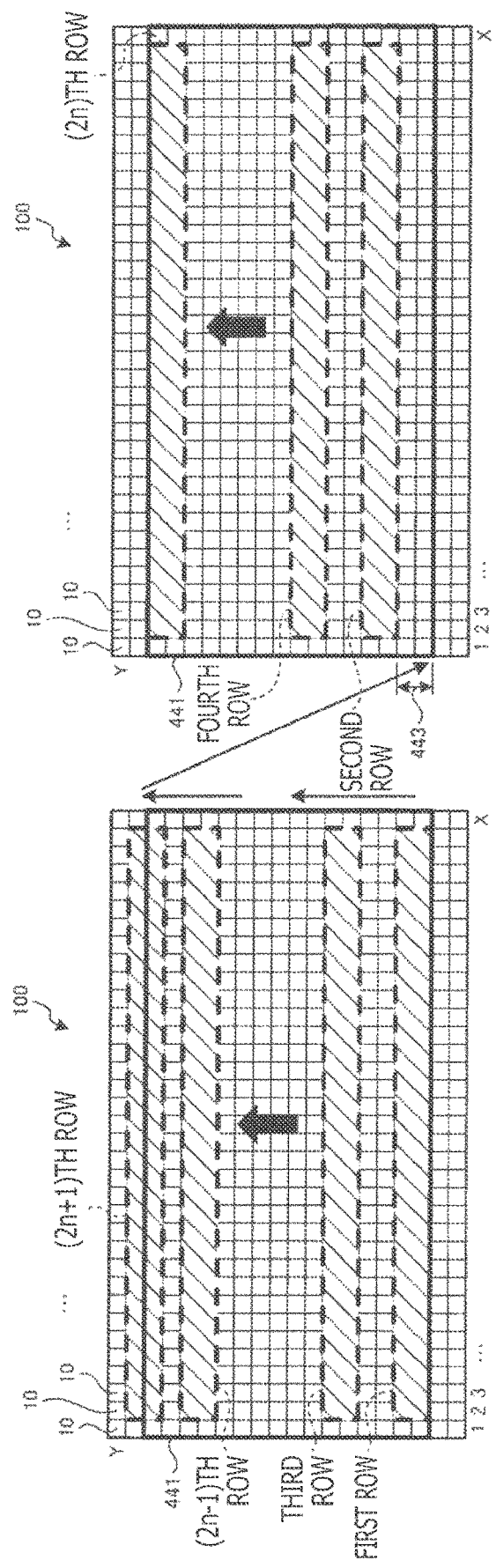
FIG. 12 is a view more particularly illustrating scanning of rows in the pixel array section according to the first embodiment.

FIG. 12 is a view more particularly illustrating scanning of rows in the pixel array section 100 according to the first embodiment. It is to be noted that, in FIG. 12, the height of one row is two pixels (two lines) for the convenience of description. Further, here, the configuration of the pixel array section 100 described with reference to FIG. 9 is applied.

In the distance measurement apparatus 1, for example, the overall controlling section 103 sets a target region 441 that is a region of a target for performing detection of light, with respect to the pixel array section 100. In the example of FIG. 12, the width of the target region 441 corresponds to the width of the pixel array section 100 in the horizontal direction, and where the value n is a predetermined natural number, the target region 441 has a height corresponding to 2n lines (2n pixels). Further, the lower end of the target region 441 is set to a position higher by two pixels than the lower end of the pixel array section 100, and the upper end of the target region 441 is set to a position lower by two pixels than the upper end of the pixel array section 100.

In the distance measurement apparatus 1, the pixel controlling section 102 starts scanning of the first row from the lower end of the target region 441 during a first frame period depicted on the left side in FIG. 12, according to an instruction of the overall controlling section 103. Thereafter, the pixel controlling section 102 scans the odd-numbered rows like the third row, fifth row and so forth while skipping each one row.

As a more particular example, the pixel controlling section 102 sets the control signal $SH\_ON_1$ to a state (on state) for turning on the switch 1104 (refer to FIG. 6) and sets the control signal $SH\_ON_2$ to a state (off state) for turning off the switch 1104, according to an instruction of the overall controlling section 103. Further, the conversion section 110 selects the signal lines $411_{11}$ to $411_{16}$ and $411_{21}$ to $411_{26}$ of a row that is made a reading out target, according to an instruction of the overall controlling section 103, and performs a process for pulses $Vpls_{11}$ to $Vpls_{16}$ and $Vpls_{21}$ to $Vpls_{26}$ supplied from the selected signal lines $411_{11}$ to $411_{16}$ and $411_{21}$ to $411_{26}$.

The pixel controlling section 102 monitors, in scanning of each row, whether or not the scanned row includes the upper end of the target region 441 or the row concerns the upper end of the target region 441. In the example of FIG. 12, the (2n−1)th row is scanned during the first frame period, and then when scanning of the (2n+1)th row skipping one row is executed, the (2n+1)th row includes the upper end of the target region 441. In this case, the pixel controlling section 102 determines that the scanning during the first frame period is completed and advances the processing to scanning for the second frame period.

In a case where the scanning period transits from the first frame period to the second frame period, the pixel controlling section 102 adds an offset 443 for the height of one row, i.e., for two pixels, to a start position of scanning for the second frame period. Accordingly, during the second frame period, scanning is started from the second row, skipping the first row. Thereafter, the pixel controlling section 102 scans the even-numbered rows like the fourth row, sixth row and so forth while successively skipping one row.

The pixel controlling section 102 monitors, in scanning of each row, whether or not the scanned row includes the upper end of the target region 441 or the row concerns the upper end of the target region 441 similarly as during the first frame period. In the example of FIG. 12, when scanning of the 2nth row is executed, the pixel controlling section 102 determines that the 2nth row concerns the upper end of the target region 441 and determines that the scanning during the second frame period is completed. After the pixel controlling section 102 determines that the scanning during the second frame period is completed, it advances the processing to scanning during the first frame period. Upon transition from the second frame period to the first frame period, the pixel controlling section 102 does not perform addition of an offset to the scanning start position.

The distance measurement apparatus 1 repeats scanning of odd-numbered rows during the first frame period and scanning of even-number rows during the second frame period in such a manner as described above, to perform distance measurement. The scanning during each of the first frame period and the second frame period can be executed in a period of time of one half of that in an alternative case in which all of the pixels 10 included in the pixel array section 100 are scanned successively.

(Data Process Applicable to First Embodiment)

Now, a data process according to the first embodiment is described with reference to FIG. 8 described hereinabove. In the pixel array section 100, by applying the interlace scanning in which scanning of odd-numbered rows is performed during the first frame period and scanning of even-numbered rows is performed during the second frame period, for example, three different data processes described below can be implemented.

Note that, it is assumed that, in the following description, the target region 441 described hereinabove includes all pixels 10 included in the pixel array section 100.

As a first process, a process using one of a distance measurement result during the first frame period and a distance measurement result during the second frame period is possible. For example, by using a distance measurement result during the first frame period during which scanning is performed first, distance measurement at a high speed (for example, in half a period of time) becomes possible in comparison with that in an alternative case in which a distance measurement result based on output of all pixels 10 included in the pixel array section 100 is used.

In this case, since the number of pixels 10 used in distance measurement becomes one half in comparison with that in an alternative case in which a distance measurement result based on output of all pixels 10 included in the pixel array section 100 is used, although the process is disadvantageous in terms of the accuracy, it is possible to recognize an overall state at a high speed. Further, this also makes it possible to easily measure the distance regarding a measurement target that moves at a high speed.

As a second process, a process of calculating the difference between a distance measurement result during the first frame period and a distance measurement result during the second frame period is possible. For example, the difference between distance measurement results of rows adjacent to each other is calculated from distance measurement results of the rows during the first frame period and distance measurement results of the rows during the second frame period. As the difference, for example, a difference between frequencies of corresponding bins in individual histograms can be applied.

In the example of FIG. 8, for example, the difference between a distance measurement result of the first row during the first frame period and a distance measurement result of the second row during the second frame period is calculated. Further, the difference between the distance measurement result of the second row during the second frame period and a distance measurement result of the third row during the first frame period is calculated. Further, the difference between the distance measurement result of the third row during the first frame period and a distance measurement result of the fourth row during the second frame period is calculated. Thereafter, the differences between distance measurement results of rows adjacent to each other during the first frame period and the second frame period are sequentially calculated in a similar manner.

Each of the first frame period and the second frame period is a period of time of one half in comparison with that in an alternative case in which all of the pixels 10 included in the pixel array section 100 are scanned.

Thus, according to the second process, distance measurement regarding a measurement target that moves at a higher speed is facilitated.

As a third process, a process of calculating the sum of a distance measurement result during the first frame period and a distance measurement result during the second frame period is possible. In this case, the sum is a process of calculating a sum set of distance information obtained by a distance measurement process during the first frame period and based on output of the pixels 10 included in the odd-numbered rows and distance information obtained by a distance measurement process during the second frame period and based on output of the pixels 10 included in the even-numbered rows. From the sum set, distance information based on output of all pixels 10 included in the pixel array section 100 can be obtained. Accordingly, distance measurement results of higher accuracy can be obtained in comparison with distance measurement results by the first process described hereinabove.

Furthermore, the first process, the second process, and the third process described above can be executed by common control for scanning of the rows in the pixel array section 100.

Figure 13:
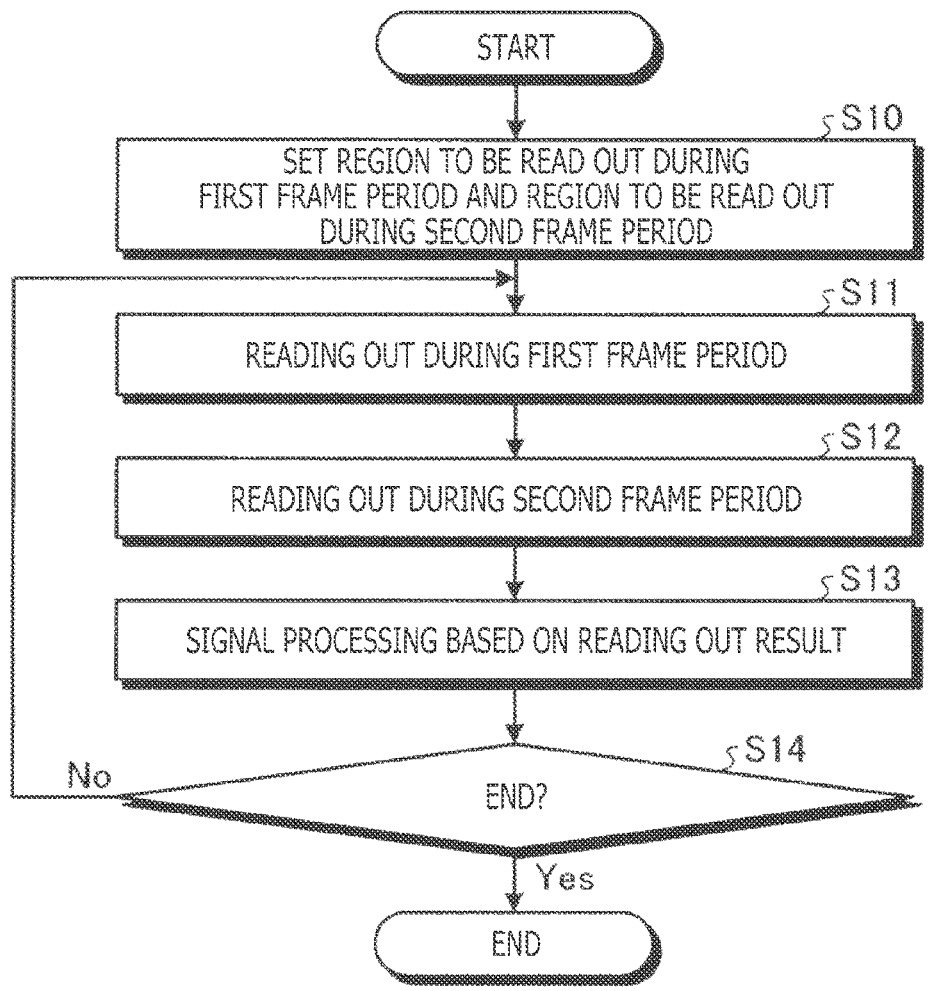
FIG. 13 is a flow chart of an example depicting a reading out process according to the first embodiment.

FIG. 13 is a flow chart of an example depicting a reading out process according to the first embodiment. In step S10, the overall controlling section 103 sets a region for reading out during a first frame period and a region for reading out during a second frame period, with respect to the pixel controlling section 102. The overall controlling section 103 may set the regions according to an instruction from the outside or may set the regions according to information stored in advance, for example, in a register or the like provided in the overall controlling section 103.

The overall controlling section 103 executes reading out during the first frame period in the next step S11. In particular, the overall controlling section 103 instructs the pixel controlling section 102 to execute reading out during the first frame period according to the information set in step S10. The pixel controlling section 102 executes reading out during the first frame period according to the instruction. After the reading out during the first frame period ends, in the next step S12, the overall controlling section 103 executes reading out during the first frame period according to the information set in step S10. In particular, the overall controlling section 103 instructs the pixel controlling section 102 to execute reading out during the second frame period. The pixel controlling section 102 executes reading out during the second frame period according to the instruction. After the reading out during the second frame period ends, the processing transits to the next step S13.

In step S13, the signal processing section 112 executes, for example, signal processing based on results of reading out in steps S11 and S12, under the control of the overall controlling section 103. In particular, the signal processing section 112 executes signal processing using at least one of a distance measurement result obtained on the basis of the pixel signals read out during the first frame period in step S11 and a distance measurement result obtained on the basis of the pixel signals read out during the second frame periods in step S12. At this time, the signal processing section 112 can execute signal processing of one or more of the first process, the second process, and the third process described hereinabove. It is to be noted that it is also possible for the overall controlling section 103 to cause the process in step 313 and the processes in steps S11 and S12 to be executed in parallel.

After the signal processing in step S13 is completed, if an instruction to end the processing is received, for example, from the outside (step S14, "Yes"), then the overall controlling section 103 ends the series of processes of the flow chart of FIG. 13. If an instruction to end the processing is not received (step 314, "No"), then the overall controlling section 103 returns the processing to step S11 to execute the processes in steps S11 to S13.

(First Modification of First Embodiment)

Now, a first modification of the first embodiment is described. The first modification of the first embodiment is an example in which the irradiation range of laser light to be emitted from the light source section 2 and the range of scanning in units of a row in the pixel array section 100 are synchronized with each other.

For example, the irradiation range of laser light by the light source section 2 in a case in which all of the pixels 10 included in the pixel array section 100 are determined as a light reception target is determined as the overall irradiation range. Referring to FIG. 8, for example, in a case where the first row in the pixel array section 100 is scanned during the first frame period, the irradiation range of laser light of the light source section 2 is restricted to a range corresponding to the first row on the lower end side of the overall irradiation range. Similarly, in a case where the third row in the pixel array section 100 is to be scanned, the irradiation range of the laser light of the light source section 2 is restricted to a range corresponding to the third row at a middle portion of the overall irradiation range.

As the configuration of the light source section 2 for restricting the irradiation range of the laser light, the configuration that uses the micromirror 433 as described hereinabove with reference to FIG. 11 can be applied. In FIG. 11, the configuration is such that laser light shaped to be narrow in the horizontal direction and elongated in the vertical direction is applied. The shape of the laser light applied by the configuration of FIG. 11 is rotated by 90 degrees, for example, by changing the direction of the aperture or the like such that the laser light has such a shape to be narrow in the vertical direction but elongated in the horizontal direction.

By restricting the irradiation range of the laser light of the light source section 2 according to scanning in units of a row in the pixel array section 100 in the manner described above, the intensity of the laser light to be applied to the measurement target can be increased.

According to the first modification of the first embodiment, an eye-safe (eye-safe) effect against the laser light emitted from the light source section 2 can be expected. The eye-safe effect according to the first modification of the first embodiment is described with reference to FIGS. 14A and 14B.

Figure 14A:
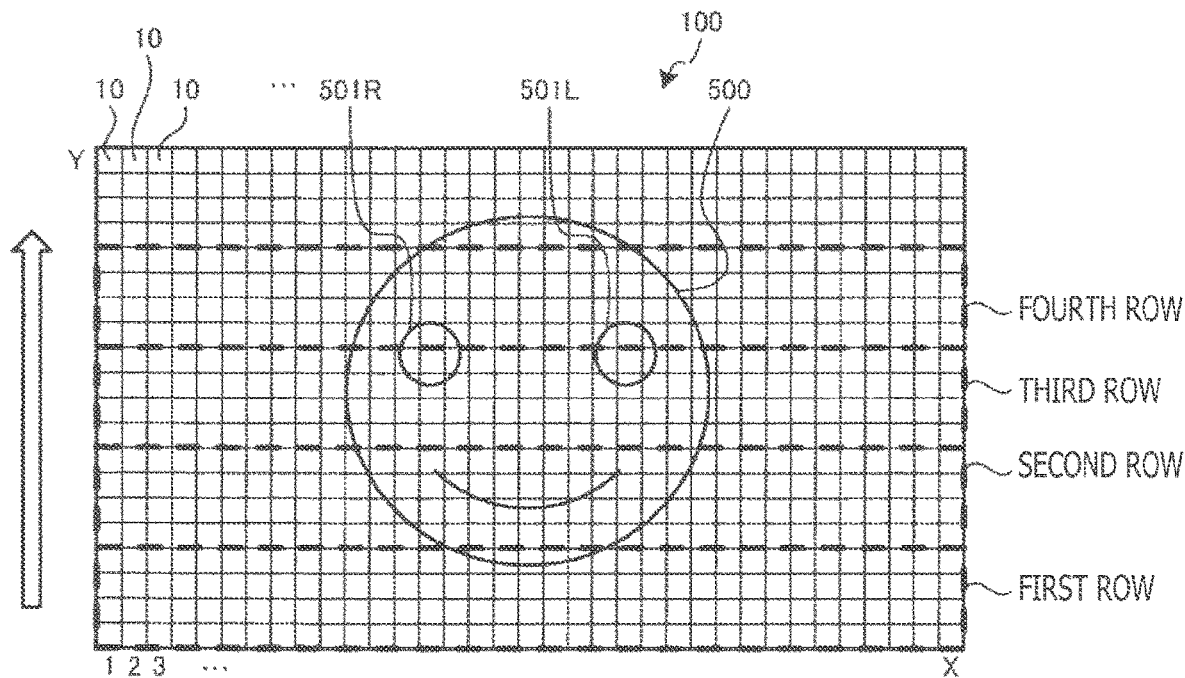
FIG. 14A is a view illustrating an eye-safe effect according to a first modification of the first embodiment.

FIG. 14A is a view schematically depicting an example of a case in which the irradiation range of laser light emitted from the light source section 2 and the range of scanning in units of a row of the pixel array section 100 in rolling scanning are synchronized with each other by an existing technology. In the case of rolling scanning, a first row, a second row, and so on adjacent to each other in the pixel array section 100 are sequentially scanned. The irradiation range of laser light by the light source section 2 is controlled in synchronism with the scanning of the first row, second row, and so on of the pixel array section 100.

Here, a case in which the face is a measurement target is considered. In FIG. 14A, a face 500 as a measurement target is schematically depicted in a corresponding relation with the pixel array section 100. In this example, depicted is a state in which the lower end of the face 500 is detected in scanning of the first row and then the second row, third row, and so on of the face 500 are detected such that the overall face 500 is detected. On the actual face 500, laser light emitted from the light source section 2 is applied within ranges corresponding to the first row, second row, and so on.

In the face 500, application of the laser light to the eyes 501R and 501L should be avoided as far as possible. However, in the example of FIG. 14A, the eyes 501R and 501L extend across the third row and the fourth row, and in the scanning of the third row and in the scanning of the fourth row, the laser light from the light source section 2 is applied to the eyes 501R and 501L.

Figure 14B:
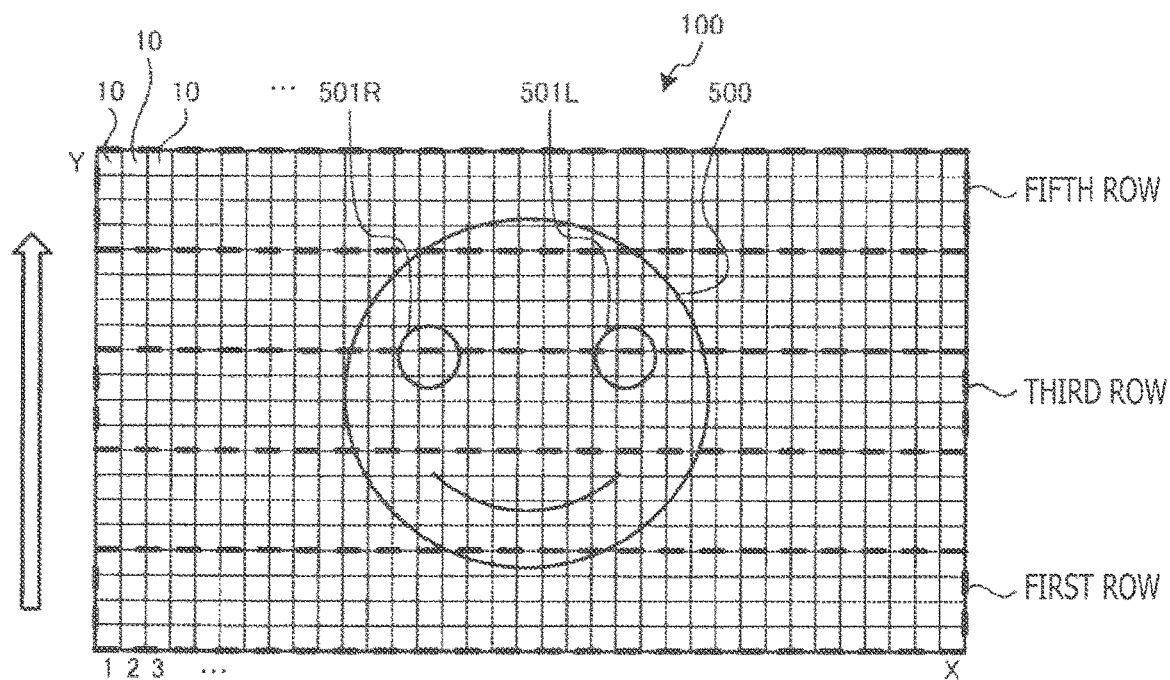
FIG. 14B is a view illustrating an eye-safe effect according to the first modification of the first embodiment.

FIG. 14B is a view schematically depicting an example of a case in which the irradiation range of laser light emitted from the light source section 2 and the range of scanning in units of a row in the pixel array section 100 are synchronized with each other in the interlace scanning according to the present technology. In FIG. 14B, an example of one frame period during which scanning of an odd-numbered row is performed is depicted. In the interlace scanning, during one frame period, after scanning of a certain row ends, next scanning is executed skipping the immediately next row.

In the example of FIG. 14B, after the scanning of the third row, the fourth row is skipped, and scanning of the fifth row is performed. Accordingly, although the laser light from the light source section 2 is applied, at the time of scanning of the third row, to the eyes 501R and 501L within a range corresponding to the third row, the range corresponding to the fourth row is not irradiated. Thus, in comparison with the case of rolling scanning, the time for which the laser light is applied to the eyes 501R and 501L is reduced, and consequently, the burden on the eyes 501R and 501L decreases, and the eye-safe effect can be anticipated.

According to the first modification of the first embodiment, it is further possible to reduce the influence of reflected light that is to enter an adjacent row when the row to be scanned is switched in the pixel array section 100. Reduction of the influence of reflected light that is to enter an adjacent row according to the first modification of the first embodiment is described with reference to FIGS. 15A and 15B.

Figure 15A:
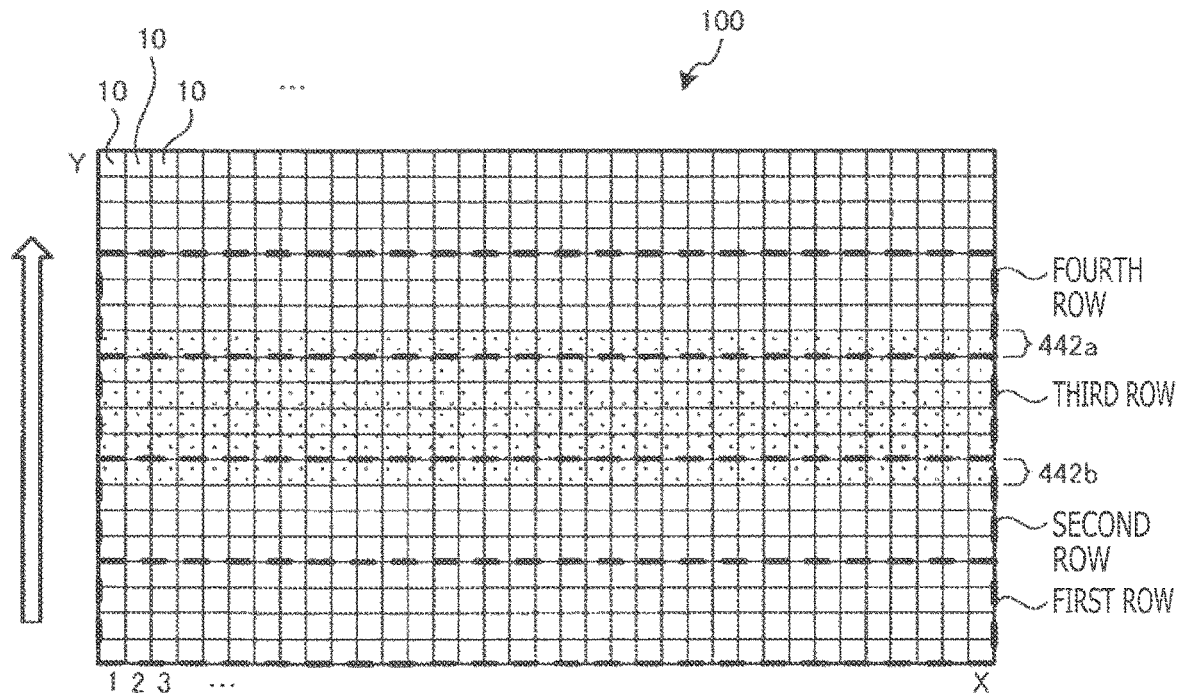
FIG. 15A is a view illustrating reduction of an influence of reflected light incident to an adjacent row according to the first modification of the first embodiment.

FIG. 15A is a view schematically depicting an example of a case in which the irradiation range of laser light to be emitted from the light source section 2 and the range of scanning in units of a row in the pixel array section 100 are synchronized with each other in rolling scanning according to an existing technology. In the case of rolling scanning, the first row, the second row, and so on adjacent to each other in the pixel array section 100 are scanned sequentially. In synchronism with the scanning of the first row, second row, and so on in the pixel array section 100, the irradiation range of the laser light by the light source section 2 is controlled.

Incidentally, reflected light from a measurement target in scanning of a certain row sometimes has an influence on an adjacent row. The example of FIG. 15A schematically indicates a state in which reflected light from a measurement target in scanning, for example, of the third row has an influence on the second row that is an adjacent row. Scanning of the second row ends, and the row for which scanning is to be performed is switched from the second row to the third row. Together with the switching of the scanning row, the irradiation range of reflected light from the measurement target moves from a range corresponding to the second row to another range corresponding to the third row. Reflected light is applied to a range rather wide than the range of the third row.

There is a possibility that, of reflected light 442a and reflected light 442b overhanging from the range of the third row, the reflected light 442b that concerns the second row may enter pixels 10 on the upper end side of the second row.

For example, it is assumed that the pixels 10 on the upper end side of the second row, which are not a scanning target at this point of time, are configured such that not the power of the power supply potential VDD to be supplied to each pixel 10 is cut, but, for example, as depicted in FIG. 6, output of the light reception element 1000 included in the pixel 10 is masked. In this case, the light reception element 1000 itself in each of pixels 10 on the upper end side of the second row is in an operative state, and if reflected light 442b enters, then the number of reactions increases with respect to the other pixels 10 (light reception elements 1000) included in the second row, resulting in the possibility of heat generation.

On the contrary, also possible is a case in which, after the scanning switches from scanning of the second row to scanning of the third row, a light component overhanging from the range of the second row of remoter reflected light components originating from the laser light applied upon scanning of the second row enters pixels 10 on the lower end side of the third row. In this case, a result of a distance measurement process of the third row is influenced by reflected light at the time of processing of the second row, resulting in a possibility that a correct result is not obtained.

Figure 15B:
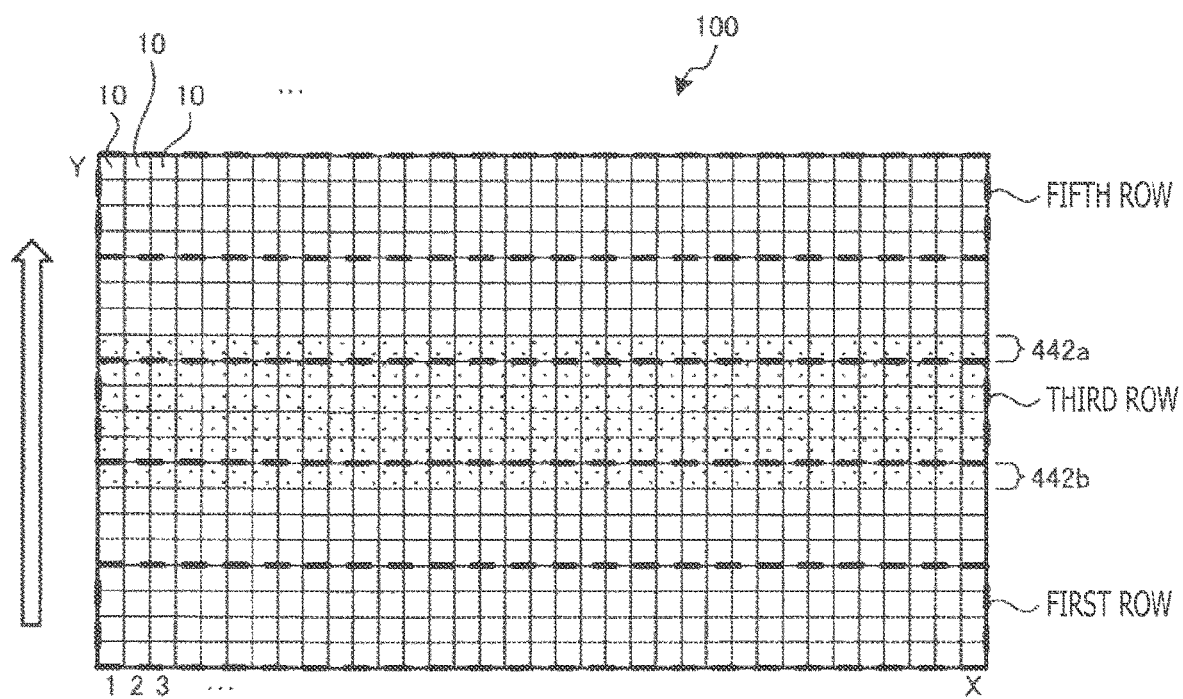
FIG. 15B is a view illustrating reduction of an influence of reflected light incident to an adjacent row according to the first modification of the first embodiment.

FIG. 15B is a view schematically depicting an example of a case in which the irradiation range of laser light to be emitted from the light source section 2 and the range of scanning in units of a row in the pixel array section 100 are synchronized with each other in interlace scanning according to the present disclosure. FIG. 15B depicts an example during a first frame period during which scanning of odd-number rows is performed.

In the interlace scanning, during one frame period, after scanning of a certain row ends, next scanning is executed skipping the immediately next row. For example, during a first frame period, a distance measurement process is not performed for the immediately preceding and succeeding rows of the third row (for the second row and the fourth row). Accordingly, even if the reflected light 442a and the reflected light 442b overhanging from the range of the third row enter the pixels 10 of such rows, an influence of this on a result of distance measurement does not appear.

(Second Modification of First Embodiment)

Now, a second modification of the first embodiment is described. The second modification of the first embodiment is an example in which the height of a row for which scanning is to be performed and the skipping amount by interlace scanning are individually variable.

Figure 16A:
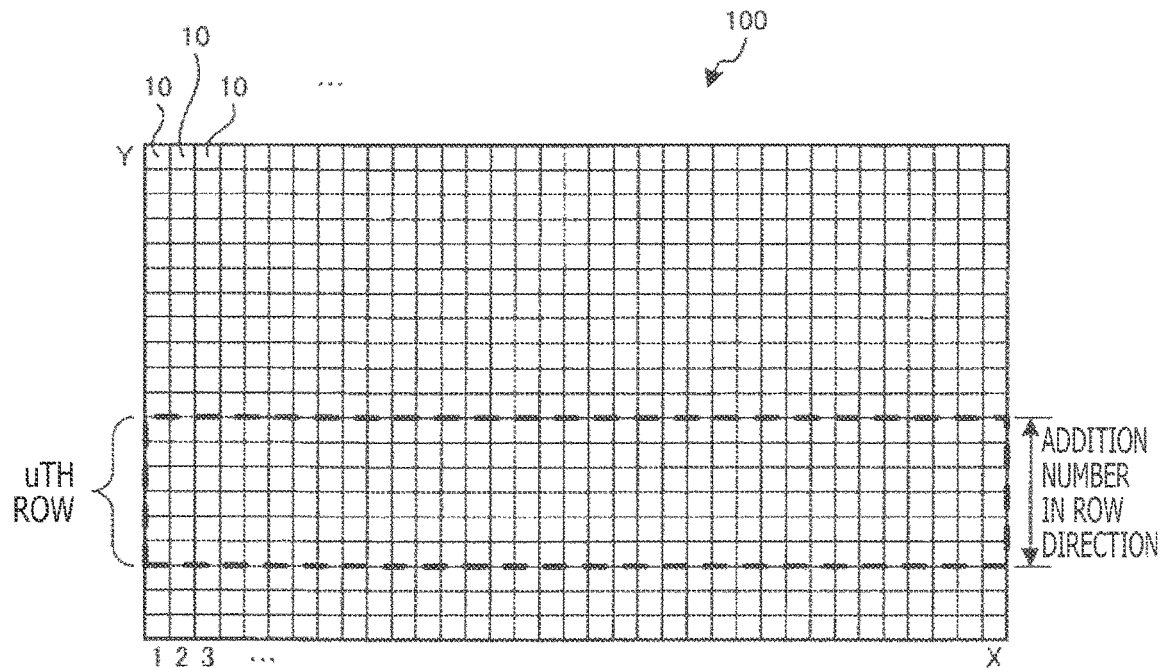
FIG. 16A is a view schematically depicting an example in which the height of a row for which scanning is to be performed is variable according to a second modification of the first embodiment.

FIG. 16A is a view schematically depicting an example in which the height of a row for which scanning is to be performed is variable according to the second modification of the first embodiment. Referring to FIG. 8, the height of a row before change is four pixels, and in the example of FIG. 16A, the height of a uth row is changed from four pixels to six rows. In a case where the width of the block 400 does not change from that before the change, by an amount by which the height of a row increases, the number of pixels 10 whose number of light reception time periods $t_m$ upon generation of a histogram is added increases. By this, the distance measurement result of the uth row after the change of the height of a row can be made more accurate.

Figure 16B:
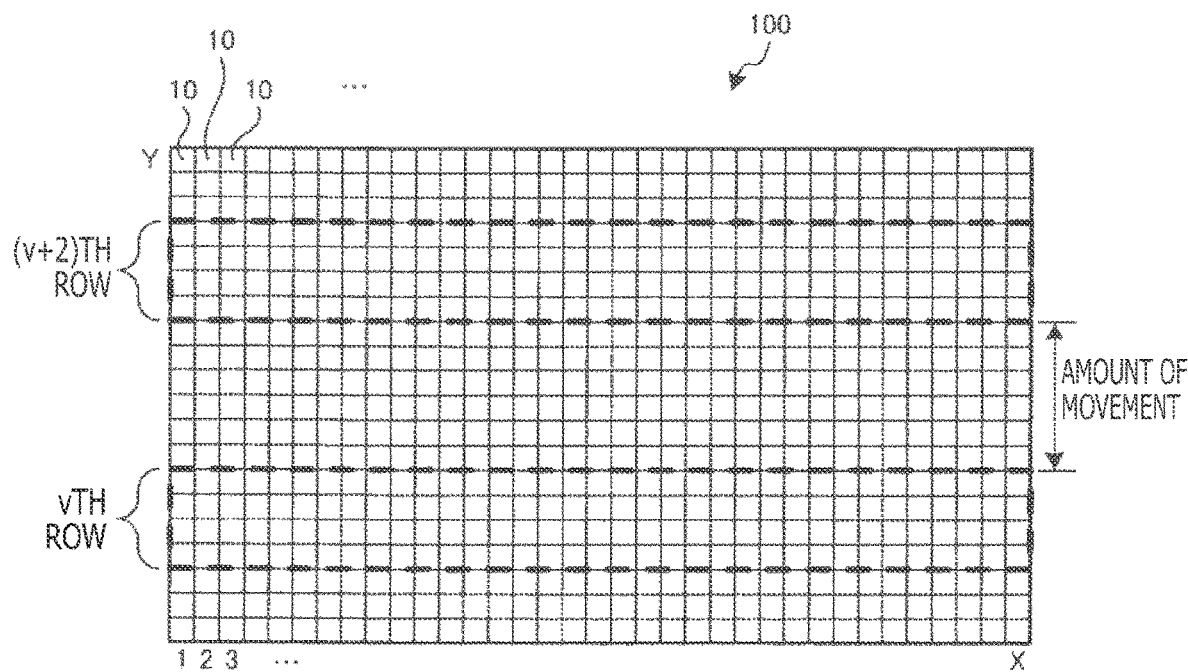
FIG. 16B is a view schematically depicting an example in which the skipping amount by interlace scanning is variable according to the second modification of the first embodiment.

FIG. 16B is a view schematically depicting an example in which the skipping amount by interlace scanning is variable according to the second modification of the first embodiment. Referring to FIG. 8, the skipping amount before the change is four pixels, and in the example of FIG. 16B, the skipping amount upon jumping from a vth row to a (v+2)th row is changed to six pixels.

In the distance measurement apparatus 1 according to the second modification of the first embodiment, the height of a row for which scanning is to be performed and the skipping amount by interlace scanning described above can be set independently of each other. As an example, the control signal SH_ON is supplied individually to pixels 10 that are aligned in a column direction, and the pixel controlling section 102 controls each control signal SH_ON between on and off states, according to an instruction of the overall controlling section 103. The pixel controlling section 102 supplies a control signal SH_ON for an instruction of turning on to pixels 10 included in a row for which scanning is to be performed and supplies a control signal SH_ON for an instruction of turning off to pixels 10 included in a row to be skipped.

By making it possible to set the height of rows for which scanning is to be performed and the skipping amount by interlace scanning independently of each other in the manner described above, it becomes possible to adjust the speed and the accuracy of a distance measurement process by the distance measurement apparatus 1. Further, it becomes possible to actively execute the adjustment of the speed and the accuracy. For example, it is possible to change adjustment of the speed or the accuracy of the distance measurement process according to a result of distance measurement.

(Third Modification of First Embodiment)

Now, a third modification of the first embodiment is described. In the first embodiment described hereinabove, rows for which scanning is to be performed are not overlapped during the first frame period and the second frame period. In contrast, the third modification of the first embodiment is an example in which ranges for which scanning is to be performed are overlapped during the first frame period and the second frame period.

FIG. 17 is a view illustrating a scanning method according to the third modification of the first embodiment. In the third modification of the first embodiment, the height of a row for which scanning is to be executed and the skipping amount by interlace scanning are set such that a row for which scanning has been performed and a row for which scanning is to be performed next become adjacent to each other during the same frame period. In the example of FIG. 17, the height of a row for which scanning is to be executed is 8 pixels and the skipping amount is 0 pixels. In this case, during the first frame period, the first row and the third row are adjacent to each other, and during the second frame period, the second row and the fourth row are adjacent to each other.

Further, one row from between two rows for which scanning is executed successively during the first frame period and the second frame period is set such that at least part thereof is not included in the other row. In the example of FIG. 17, during the second frame period, scanning is started with an offset by four pixels added to the first frame period.

As described hereinabove, by setting a height and a skipping amount of each row and an offset amount for the second frame period, an overlapping portion 447 appears in the second row and the fourth row for which scanning is executed during the second frame period and in the first row and the third row for which scanning is executed during the first frame period.

At this time, in the example of FIG. 17, during the first frame period, a lower half of the first row does not overlap with the scanning range during the second frame period, and during the second frame period, an upper half of the fourth row does not overlap with the scanning rage during the first frame period. Further, scanning of the rows during the first frame period and the second frame period is executed such that the sum set of the pixels 10 included in the scanning range during the first frame period and the pixels 10 included in the scanning range during the second frame period includes all pixels 10 included in the pixel array section 100.

In other words, this can be considered that part of the first light reception element group that is a set of the pixels 10 that are read out during the first frame period does not include the pixels 10 included in the second light reception element group that is a set of the pixels 10 read out during the second frame period and that the sum set of the first light reception element group and the second light reception element group includes a light reception element group including all pixels 10 included in the target region of the pixel array section 100.

In the overlapping portion 447, the number of pixels 10 to which the number of light reception time periods $t_m$ is added upon generation of a histogram becomes greater in comparison with that in an alternative case in which scanning ranges do not overlap during the first frame period and the second frame period. Consequently, a distance measurement result of higher accuracy can be obtained. Further, since the addition number of light reception time periods $t_m$ increases, it becomes possible to perform noise removal from the generated histogram and improve the accuracy of the time difference between the first frame period and the second frame period.

As an example, control of scanning by the distance measurement apparatus 1 according to the third modification of the first embodiment can be performed by control of the control signals $SH\_ON_1$ and $SH\_ON_2$ described hereinabove with reference to FIG. 9. In the case of the third modification of the first embodiment, for example, the control signals $SH\_ON_1$ and $SH\_ON_2$ are supplied to the respective pixels 10 included in the overlapping portion 447 and overlapping during the first frame period and the second frame period. In the example of FIG. 6, on/off of the switch 1104 is controlled respectively by the control signals $SH\_ON_1$ and $SH\_ON_2$.

For example, in a case where scanning during the first frame period is to be performed, the control signal $SH\_ON_1$ is placed in an on state, and the control signal $SH\_ON_2$ is placed in an off state. On the other hand, in a case where scanning during the second frame period is to be performed, the control signal $SH\_ON_1$ is placed in an off state, and the control signal $SH\_ON_2$ is placed in an on state.

(Fourth Modification of First Embodiment)

Now, a fourth modification of the first embodiment is described. In the first embodiment described hereinabove, scanning of the pixel array section 100 is divided into scanning during a first frame period during which scanning for odd-numbered rows is performed and scanning during a second frame period during which scanning for even-numbered rows is performed, to thereby perform interlace scanning. In the first embodiment, upon such interlace scanning, scanning during the second frame period is executed after scanning during the first scanning period is executed. However, this is not restrictive, and scanning during the first frame period may be executed after scanning during the second frame period is executed.

Further, in the first embodiment described hereinabove, a scanning period is divided into two periods including a first frame period during which scanning for odd-numbered rows is performed and a second frame period during which scanning for even-numbered rows is performed, to perform interlace scanning. However, this is not restrictive. For example, where m=1, 2, 3, and so on holds, a scanning period may be divided into three periods including a frame period during which scanning of the (3m−2)th rows is executed, another frame period during which scanning of the (3m−1)th rows is executed, and a further frame period during which scanning of the 3mth rows is executed, to execute interlace scanning. It is also possible to divide the scanning period into four or more periods to execute interlace scanning.

Second Embodiment

Figure 18:
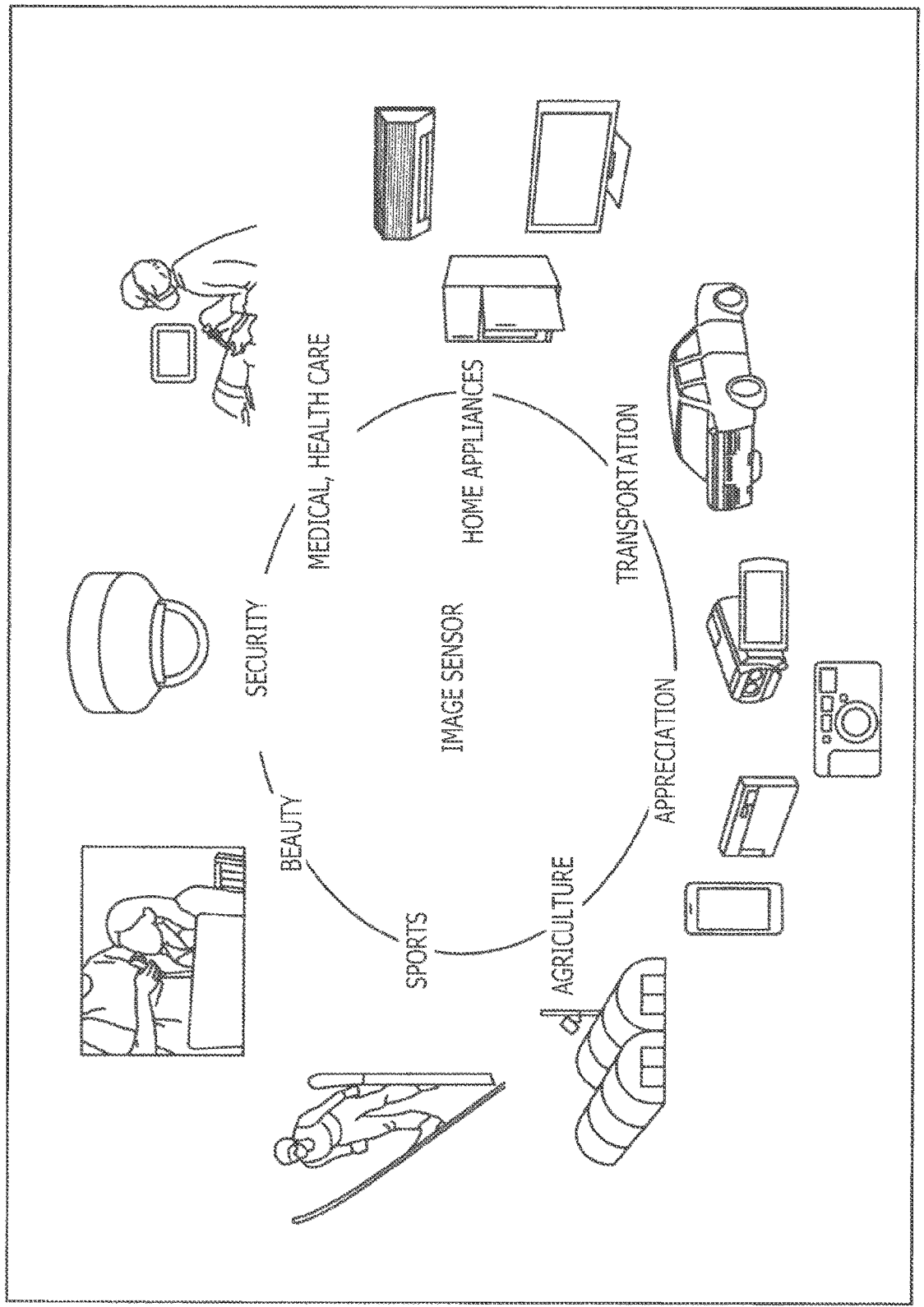
FIG. 18 is a view depicting an example of use in which the distance measurement apparatus according to the first embodiment and modifications of the first embodiment is used by a second embodiment.

Now, as a second embodiment of the present disclosure, an application example of the first embodiment of the present disclosure and the modifications of the first embodiment is described. FIG. 18 is a view depicting examples of use in which the distance measurement apparatus 1 according to any of the first embodiment and the modifications of the first embodiment described hereinabove is used according to the second embodiment.

The distance measurement apparatus 1 described above can be used in various cases in which light such as visible light, infrared light, ultraviolet light, X rays and so forth is to be sensed, for example, as described below.

- Apparatus for capturing an image to be used for appreciation such as a digital camera and a portable apparatus with a camera function.
- Apparatus used for transportation such as an in-vehicle sensor that captures an image of the front, rear, surroundings, inside and so forth of an automobile for safe driving such as automatic stopping or the like or for the recognition and so forth of a driver, a monitoring camera for monitoring a traveling vehicle and a road, and a distance measurement sensor for performing measurement of the distance between vehicles.
- Apparatus used for an electric appliance such as a TV, a refrigerator, and an air conditioner in order to capture an image of a gesture of a user and perform an apparatus operation according to the gesture.
- Apparatus used for medical care or health care such as an endoscope and a device for performing blood vessel imaging by reception of infrared light.
- Apparatus used for security such as a monitor camera for security applications and a camera for personal authentication applications.
- Apparatus used for beauty such as a skin measuring instrument for imaging the skin and a microscope for imaging the scalp.
- Apparatus used for sports such as an action camera and a wearable camera for sports applications and so forth.
- Apparatus used for agriculture such as a camera for monitoring a state of a field and crops.

Further Examples of Application of Technology According to Present Disclosure (Example of Application to Mobile Body)

The technology according to the present disclosure may be applied to an apparatus that is incorporated in a mobile body of any kind such as an automobile, an electric car, a hybrid electric car, a motorcycle, a bicycle, a personal mobility, an airplane, a drone, a ship, or a robot.

Figure 19:
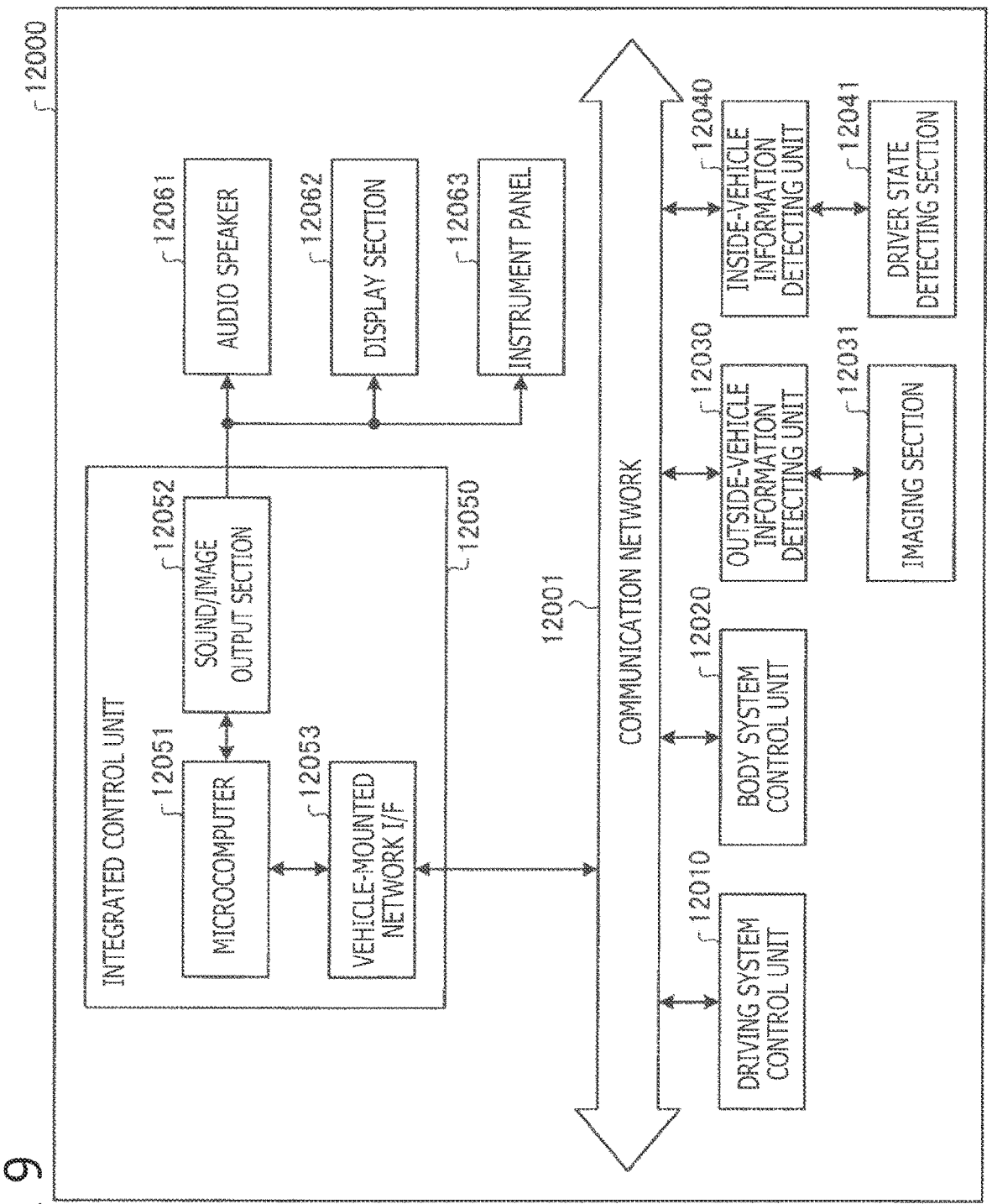
FIG. 19 is a block diagram depicting an example of a schematic configuration of a vehicle control system that is an example of a mobile body controlling system to which the technology according to the present disclosure can be applied.

FIG. 19 is a block diagram depicting an example of a schematic configuration of a vehicle control system as an example of a mobile body control system to which the technology according to the present disclosure can be applied.

The vehicle control system 12000 includes plural electronic control units connected to each other via a communication network 12001. In the example depicted in FIG. 19, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information regarding the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto. The outside-vehicle information detecting unit 12030 performs an image process, for example, for a received image and performs an object detecting process or a distance detecting process on the basis of a result of the image process.

The imaging section 12031 is an optical sensor that receives light and that outputs an electric signal corresponding to a received light amount of the light. The imaging section 12031 can output the electric signal as an image, or can output the electric signal as information regarding a measured distance. In addition, the light received by the imaging section 12031 may be visible light, or may be invisible light such as infrared rays or the like.

The in-vehicle information detecting unit 12040 detects information regarding the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information regarding the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an ADAS (advanced driver assistance system) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information regarding the surroundings of the vehicle which information is obtained by the outside-vehicle information detecting unit 12030 or the in-vehicle information detecting unit 12040.

In addition, the microcomputer 12051 can output a control command to the body system control unit 12020 on the basis of the information regarding the outside of the vehicle which information is obtained by the outside-vehicle information detecting unit 12030. For example, the microcomputer 12051 can perform cooperative control intended to prevent a glare by controlling the headlamp to change from a high beam to a low beam, for example, according to the position of a preceding vehicle or an oncoming vehicle detected by the outside-vehicle information detecting unit 12030.

The sound/image output section 12052 transmits an output signal of at least one of a sound and an image to an output device capable of visually or auditorily notifying an occupant of the vehicle or the outside of the vehicle of information. In the example of FIG. 19, an audio speaker 12061, a display section 12062, and an instrument panel 12063 are illustrated as the output device. The display section 12062 may, for example, include at least one of an on-board display and a head-up display.

Figure 20:
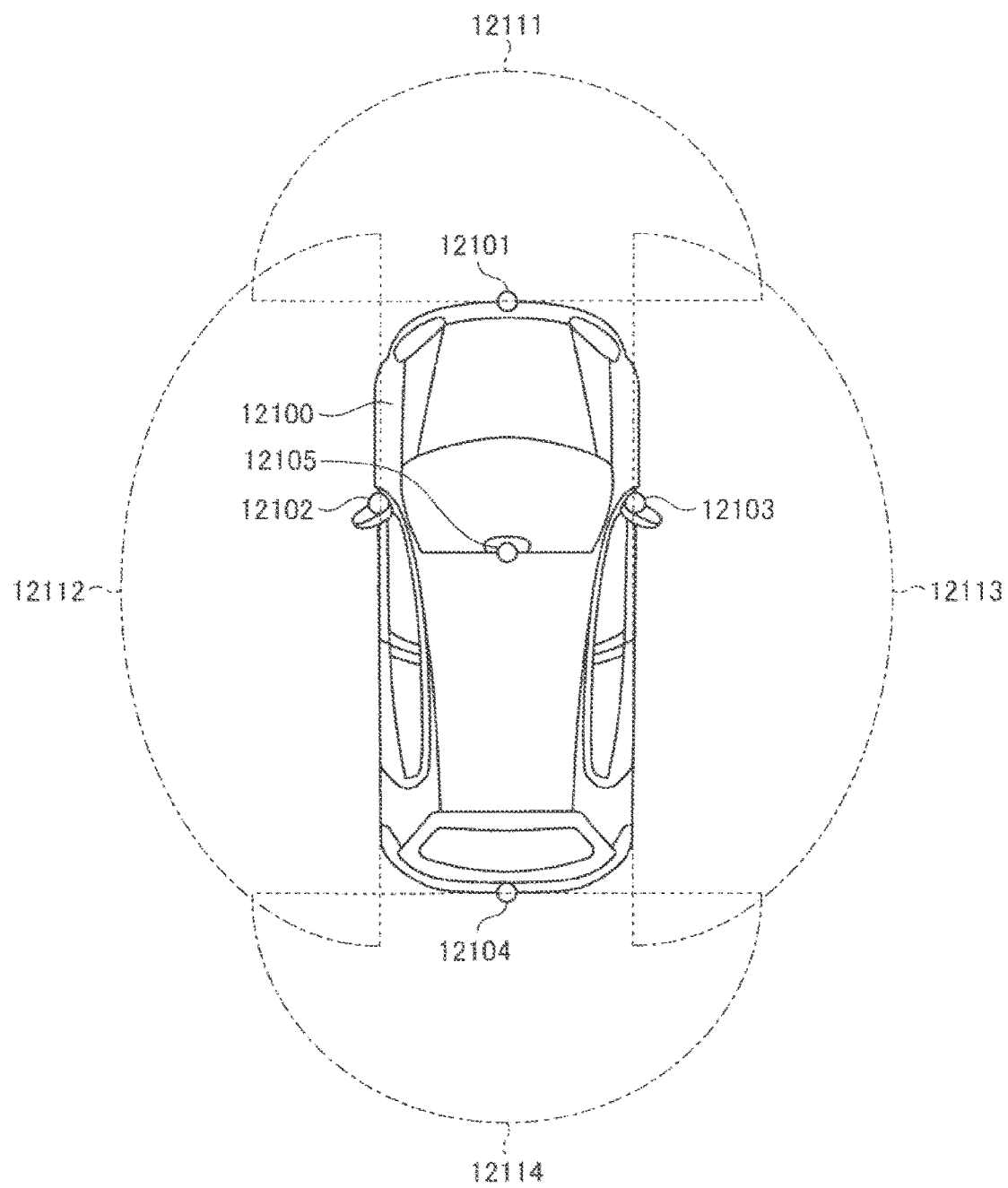
FIG. 20 is a diagram depicting an example of an installation position of an imaging section.

FIG. 20 is a diagram depicting an example of the installation position of the imaging section 12031. In FIG. 20, the vehicle 12100 includes, as the imaging section 12031, imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. An image of the front obtained by the imaging sections 12101 and 12105 is used mainly to detect a preceding vehicle, a pedestrian, an obstacle, a signal, a traffic sign, a lane, or the like.

Incidentally, FIG. 20 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera including plural imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and that travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104 and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure can be applied has been described above. The technology according to the present disclosure can, for example, be applied to the imaging section 12031 among the configurations described above. In particular, the distance measurement apparatus 1 according to the first embodiment and the modifications of the first embodiment of the present disclosure described hereinabove can be applied to the imaging section 12031. By applying the technology according to the present disclosure to the imaging section 12031, distance measurement from a traveling vehicle can be executed with higher accuracy.

It is to be noted that the advantageous effects described in the present specification are illustrative to the last and are not restrictive, and other advantageous effects may be available.

It is to be noted that the present technology can also have the following configurations.

(1)

A measurement apparatus including:

a light reception section including a light reception element group including plural light reception elements included in a target region;

a control section that controls a first light reception element group and a second light reception element group included in the light reception element group, so as to read out the first light reception element group and the second light reception element group during periods different from each other; and a signal processing section that performs signal processing on the basis of a signal read out from at least one of the first light reception element group and the second light reception element group, in which a sum set of the first light reception element group and the second light reception element group includes all of the plural light reception elements, and at least part of the first light reception element group is not included in the second light reception element group.

(2)

The measurement apparatus according to (1) above, in which the first light reception element group and the second light reception element group do not include the same light reception elements.

(3)

The measurement apparatus according to (1) or (2) above, in which the signal processing section performs the signal processing on the basis of a difference between a signal read out from the first light reception element group and a signal read out from the second light reception element group.

(4)

The measurement apparatus according to (1) or (2) above, in which the signal processing section performs the signal processing on the basis of a sum of a signal read out from the first light reception element group and a signal read out from the second light reception element group.

(5)

The measurement apparatus according to (1) or (2) above, in which the signal processing section performs the signal processing for any one of a signal read out from the first light reception element group and a signal read out from the second light reception element group.

(6)

The measurement apparatus according to any one of (1) to (5) above, in which the plural light reception elements are arrayed in a two-dimensional grid pattern to form the light reception element group, and the control section sequentially reads out plural first scanning ranges each including plural lines that are included in the first light reception element group and are arranged successively in a column direction of the array of the two-dimensional grid pattern, and, after the reading out of the plural first scanning ranges, sequentially reads out plural second scanning ranges each including plural lines that are included in the second light reception element group and are arranged successively in the column direction.

(7)

The measurement apparatus according to (6) above, in which the control section sets a distance between the plural first scanning ranges, the number of lines included in each of the plural first scanning ranges, a distance between the plural second scanning ranges, and the number of lines included in each of the plural second scanning ranges independently of each other.

(8)

A distance measurement apparatus including:

a light reception section including a light reception element group including plural light reception elements included in a target region;

a control section that controls a first light reception element group and a second light reception element group included in the light reception element group, so as to read out the first light reception element group and the second light reception element group during periods different from each other;

a time measurement section that measures, on the basis of a signal read out from at least one of the first light reception element group and the second light reception element group, a period of time from a light emission timing at which a light source emits light to a light reception timing at which each of the light reception elements, from which the signal is read out, among the plural light reception elements receives the light, to acquire measurement values;

a generation section that generates a histogram of the measurement values acquired by the time measurement section; and a calculation section that performs calculation of a distance to a measurement target on the basis of the histogram, in which a sum set of the first light reception element group and the second light reception element group includes all of the plural light reception elements, and at least part of the first light reception element group is not included in the second light reception element group.

(9)

The distance measurement apparatus according to (8) above, in which the first light reception element group and the second light reception element group do not include the same light reception elements.

(10)

The distance measurement apparatus according to (8) or (9) above, in which the calculation section performs the calculation on the basis of a difference between a signal read out from the first light reception element group and a signal read out from the second light reception element group.

(11)

The distance measurement apparatus according to (8) or (9) above, in which the calculation section performs the calculation on the basis of a sum of a signal read out from the first light reception element group and a signal read out from the second light reception element group.

(12)

The distance measurement apparatus according to (8) or (9) above, in which the calculation section performs the calculation for any one of a signal read out from the first light reception element group and a signal read out from the second light reception element group.

(13)

The distance measurement apparatus according to any one of (8) to (12) above, in which the plural light reception elements are arrayed in a two-dimensional grid pattern to form the light reception element group, and the control section sequentially reads out plural first scanning ranges each including plural lines that are included in the first light reception element group and are arranged successively in a column direction of the array of the two-dimensional grid pattern, and, after the reading out of the plural first scanning ranges, sequentially reads out plural second scanning ranges each including plural lines that are included in the second light reception element group and are arranged successively in the column direction.

(14)
The distance measurement apparatus according to (13) above, in which
the control section
sets a distance between the plural first scanning ranges, the number of lines included in each of the plural first scanning ranges, a distance between the plural second scanning ranges, and the number of lines included in each of the plural second scanning ranges independently of each other.

(15)
A measurement method comprising:
a controlling step of controlling a first light reception element group and a second light reception element group included in a light reception element group including plural light reception elements that are provided in a light reception section and are included in a target region, so as to read out the first light reception element group and the second light reception element group during periods different from each other; and
a signal processing step of performing signal processing on the basis of a signal read out from at least one of the first light reception element group and the second light reception element group, in which
a sum set of the first light reception element group and the second light reception element group includes all of the plural light reception elements, and at least part of the first light reception element group is not included in the second light reception element group.

REFERENCE SIGNS LIST 1, 300: Distance measurement apparatus
2, 301: Light source section
3: Storage section
4: Control section
10, $10_{11}$, $10_{12}$, $10_{13}$, $10_{14}$, $10_{14}'$, $10_{15}$, $10_{15}'$, $10_{16}$, $10_{16}'$, $10_{21}$, $10_{22}$, $10_{23}$, $10_{24}$, $10_{24}'$, $10_{25}$, $10_{25}'$, $10_{26}$, $10_{26}'$, $10_A$, $10_B$: Pixel
20: Light reception chip
21: Logic chip
100, 100': Pixel array section
101: Distance measurement processing section
102: Pixel controlling section
103: Overall controlling section
104: Clock generation section
105: Light emission timing controlling section
106: Interface
111: Generation section
112: Signal processing section
400: Block
$410_1$, $410_2$: Control line
$411_{11}$, $411_{12}$, $411_{13}$, $411_{14}$, $411_{15}$, $411_{16}$, $411_{21}$, $411_{22}$, $411_{23}$, $411_{24}$, $411_{25}$, $411_{26}$, $411_C$: Signal line
441: Target region
443: Offset

The invention claimed is:
1. A measurement apparatus comprising:
a light reception section including a light reception element group including plural light reception elements included in a target region;
a control section that controls a first light reception element group and a second light reception element group included in the light reception element group, so as to read out the first light reception element group and the second light reception element group during periods different from each other; and
a signal processing section that performs signal processing on a basis of a signal read out from at least one of the first light reception element group and the second light reception element group, wherein
a sum set of the first light reception element group and the second light reception element group includes all of the plural light reception elements,
at least part of the first light reception element group is not included in the second light reception element group,
the first light reception element group and the second light reception element group do not include same light reception elements, and
the plural light reception elements are arrayed in a two-dimensional grid pattern to form the light reception element group, and wherein
the control section
sequentially reads out plural first scanning ranges each including plural lines that are included in the first light reception element group and are arranged successively in a column direction of the array of the two-dimensional grid pattern,
after the reading out of the plural first scanning ranges, sequentially reads out plural second scanning ranges each including plural lines that are included in the second light reception element group and are arranged successively in the column direction, and
sets a distance between the plural first scanning ranges, a number of lines included in each of the plural first scanning ranges, a distance between the plural second scanning ranges, and the number of lines included in each of the plural second scanning ranges independently of each other.

2. A distance measurement apparatus comprising:
a light reception section including a light reception element group including plural light reception elements included in a target region;
a control section that controls a first light reception element group and a second light reception element group included in the light reception element group, so as to read out the first light reception element group and the second light reception element group during periods different from each other;
a time measurement section that measures, on a basis of a signal read out from at least one of the first light reception element group and the second light reception element group, a period of time from a light emission timing at which a light source emits light to a light reception timing at which each of the light reception elements, from which the signal is read out, among the plural light reception elements receives the light, to acquire measurement values;
a generation section that generates a histogram of the measurement values acquired by the time measurement section; and
a calculation section that performs calculation of a distance to a measurement target on a basis of the histogram, wherein
a sum set of the first light reception element group and the second light reception element group includes all of the plural light reception elements, at least part of the first light reception element group is not included in the second light reception element group, and the first light reception element group and the second light reception element group do not include same light reception elements, and the plural light reception elements are arrayed in a two-dimensional grid pattern to form the light reception element group, and wherein the control section sequentially reads out plural first scanning ranges each including plural lines that are included in the first light reception element group and are arranged successively in a column direction of an array of the two-dimensional grid pattern, after the reading out of the plural first scanning ranges, sequentially reads out plural second scanning ranges each including plural lines that are included in the second light reception element group and are arranged successively in the column direction, and sets a distance between the plural first scanning ranges, a number of lines included in each of the plural first scanning ranges, a distance between the plural second scanning ranges, and the number of lines included in each of the plural second scanning ranges independently of each other.

3. A measurement method comprising:

controlling a first light reception element group and a second light reception element group included in a light reception element group including plural light reception elements that are provided in a light reception section and are included in a target region, so as to read out the first light reception element group and the second light reception element group during periods different from each other;

performing signal processing on a basis of a signal read out from at least one of the first light reception element group and the second light reception element group, wherein a sum set of the first light reception element group and the second light reception element group includes all of the plural light reception elements, at least part of the first light reception element group is not included in the second light reception element group, the first light reception element group and the second light reception element group do not include same light reception elements, and the plural light reception elements are arrayed in a two-dimensional grid pattern to form the light reception element group;

sequentially reading out plural first scanning ranges each including plural lines that are included in the first light reception element group and are arranged successively in a column direction of the array of the two-dimensional grid pattern; and after the reading out of the plural first scanning ranges, sequentially reading out plural second scanning ranges each including plural lines that are included in the second light reception element group and are arranged successively in the column direction; and setting a distance between the plural first scanning ranges, a number of lines included in each of the plural first scanning ranges, a distance between the plural second scanning ranges, and the number of lines included in each of the plural second scanning ranges independently of each other.

4. A non-transitory computer readable medium storing a program for measurement, the program being executable by a processor to perform operations comprising:

controlling a first light reception element group and a second light reception element group included in a light reception element group including plural light reception elements that are provided in a light reception section and are included in a target region, so as to read out the first light reception element group and the second light reception element group during periods different from each other;

performing signal processing on a basis of a signal read out from at least one of the first light reception element group and the second light reception element group, wherein a sum set of the first light reception element group and the second light reception element group includes all of the plural light reception elements, at least part of the first light reception element group is not included in the second light reception element group, the first light reception element group and the second light reception element group do not include same light reception elements, and the plural light reception elements are arrayed in a two-dimensional grid pattern to form the light reception element group;

sequentially reading out plural first scanning ranges each including plural lines that are included in the first light reception element group and are arranged successively in a column direction of the array of the two-dimensional grid pattern;

after the reading out of the plural first scanning ranges, sequentially reading out plural second scanning ranges each including plural lines that are included in the second light reception element group and are arranged successively in the column direction; and setting a distance between the plural first scanning ranges, a number of lines included in each of the plural first scanning ranges, a distance between the plural second scanning ranges, and the number of lines included in each of the plural second scanning ranges independently of each other.

* * * * *